US007236486B2

(12) United States Patent
Baker et al.

(10) Patent No.: US 7,236,486 B2
(45) Date of Patent: Jun. 26, 2007

(54) INTEGRATED CUSTOMER WEB STATION FOR WEB BASED CALL MANAGEMENT

(75) Inventors: Thomas E. Baker, Monument, CO (US); Susan L. Chaffee, Colorado Springs, CO (US); Yuchien Chen, Colorado Springs, CO (US); Charles J. Gruber, Monument, CO (US); Howard P. Fishman, Colorado Springs, CO (US)

(73) Assignee: MCI, LLC, Basking Ridge, NJ (US)

( * ) Notice: Subject to any disclaimer, the term of this patent is extended or adjusted under 35 U.S.C. 154(b) by 71 days.

(21) Appl. No.: 11/240,608

(22) Filed: Sep. 30, 2005

(65) Prior Publication Data
US 2006/0098583 A1 May 11, 2006

Related U.S. Application Data

(63) Continuation of application No. 09/945,589, filed on Sep. 4, 2001, now Pat. No. 6,956,845, which is a continuation of application No. 09/159,506, filed on Sep. 24, 1998, now Pat. No. 6,611,498.

(60) Provisional application No. 60/060,655, filed on Sep. 26, 1997.

(51) Int. Cl.
*H04J 1/16* (2006.01)

(52) U.S. Cl. .................. 370/352; 370/386; 709/223; 713/200

(58) Field of Classification Search ........ 370/352–356, 370/400, 401, 252, 386, 389; 709/203, 202, 709/205, 223; 379/88.17, 90.01; 713/153, 713/200
See application file for complete search history.

(56) References Cited
U.S. PATENT DOCUMENTS
4,160,129 A 7/1979 Peyser et al.
(Continued)

FOREIGN PATENT DOCUMENTS
EP 0 747 841 12/1996
(Continued)

OTHER PUBLICATIONS
Biggs, M., *Inforworld*, Jun. 16, 1997, v.19, No. 24, p. 824.
(Continued)

*Primary Examiner*—John Pezzlo

(57) ABSTRACT

A Web-based call routing management workstation application which allows authorized customers to control toll free routing and monitor call center status. An architecture including one or more web servers located in a firewalled demilitarized zone (DMZ) as communications medium between the customer workstations at the customer sites and the enterprise back-end applications providing the call routing management services, provides a secure infrastructure for accessing the enterprise applications via the otherwise insecure public Internet. The present invention enables creation and management of call by call routing rules by a customer with a workstation having an Internet access and a supported Web browser. The customized rules may be tested and/or debugged via the Web-enabled workstation, using a debugger/tester which runs the routing rules under a simulated environment. In addition, customers may provision hierarchies for their business; create, modify or delete agent pools; manipulate capacity tables; and define quota schemes, value lists and schedule tables, all at the customer site via the Web-enabled workstation. The present invention also enables the customers to view near real-time displays of call center ACD statistics and peg counts based on routing rules, as well as, run provisioning and statistical reports on provisioning and statistical data and also to extract the data for further analysis. Additionally, the present invention supports foreign language and branding features on a graphical user interface. An infrastructure is provided which enables secure initiation, acquisition, and presentation of the call manager functionalities to customers from any computer workstation having a web browser and located anywhere in the world.

26 Claims, 20 Drawing Sheets

U.S. PATENT DOCUMENTS

| | | | |
|---|---|---|---|
| 4,345,315 A | 8/1982 | Cadotte et al. |
| 4,817,050 A | 3/1989 | Komatsu et al. |
| 4,823,373 A | 4/1989 | Takahashi et al. |
| 4,893,248 A | 1/1990 | Pitts et al. |
| 4,972,504 A | 11/1990 | Daniel, Jr. et al. |
| 5,041,972 A | 8/1991 | Frost |
| 5,075,771 A | 12/1991 | Hashimoto |
| 5,088,052 A | 2/1992 | Spielman et al. |
| 5,131,020 A | 7/1992 | Liebesny et al. |
| 5,136,707 A | 8/1992 | Block et al. |
| 5,208,908 A | 5/1993 | Harrison et al. |
| 5,223,699 A | 6/1993 | Flynn et al. |
| 5,228,076 A | 7/1993 | Hopner et al. |
| 5,245,533 A | 9/1993 | Marshall |
| 5,262,760 A | 11/1993 | Iwamura et al. |
| 5,285,494 A | 2/1994 | Sprecher et al. |
| 5,287,270 A | 2/1994 | Hardy et al. |
| 5,313,598 A | 5/1994 | Yamakawa |
| 5,315,093 A | 5/1994 | Stewart |
| 5,325,290 A | 6/1994 | Cauffman et al. |
| 5,327,486 A | 7/1994 | Wolff et al. |
| 5,361,259 A | 11/1994 | Hunt et al. |
| 5,369,571 A | 11/1994 | Metts |
| 5,452,446 A | 9/1995 | Johnson |
| 5,475,836 A | 12/1995 | Harris et al. |
| 5,481,542 A | 1/1996 | Logston et al. |
| 5,483,596 A | 1/1996 | Rosenow et al. |
| 5,490,060 A | 2/1996 | Malec et al. |
| 5,491,779 A | 2/1996 | Bezjian |
| 5,491,796 A | 2/1996 | Wanderer et al. |
| 5,506,893 A | 4/1996 | Buscher et al. |
| 5,526,257 A | 6/1996 | Lerner |
| 5,530,744 A | 6/1996 | Charalambous et al. |
| 5,533,108 A | 7/1996 | Harris et al. |
| 5,537,611 A | 7/1996 | Rajagopal et al. |
| 5,539,734 A | 7/1996 | Burwell et al. |
| 5,548,726 A | 8/1996 | Pettus |
| 5,551,025 A | 8/1996 | O'Reilly et al. |
| 5,555,290 A | 9/1996 | McLeod et al. |
| 5,557,668 A | 9/1996 | Brady |
| 5,563,805 A | 10/1996 | Arbuckle et al. |
| 5,566,351 A | 10/1996 | Crittenden et al. |
| 5,586,260 A | 12/1996 | Hu |
| 5,602,918 A | 2/1997 | Chen et al. |
| 5,610,915 A | 3/1997 | Elliott et al. |
| 5,621,727 A | 4/1997 | Vaudreuil |
| 5,623,601 A | 4/1997 | Vu |
| 5,630,066 A | 5/1997 | Gosling |
| 5,649,182 A | 7/1997 | Reitz |
| 5,650,994 A | 7/1997 | Daley |
| 5,659,601 A | 8/1997 | Cheslog |
| 5,666,481 A | 9/1997 | Lewis |
| 5,671,354 A | 9/1997 | Ito et al. |
| 5,689,645 A | 11/1997 | Schettler et al. |
| 5,692,030 A | 11/1997 | Teglovic et al. |
| 5,692,181 A | 11/1997 | Anand et al. |
| 5,694,546 A | 12/1997 | Reisman |
| 5,696,906 A | 12/1997 | Peters et al. |
| 5,699,403 A | 12/1997 | Ronnen |
| 5,699,528 A | 12/1997 | Hogan |
| 5,706,502 A | 1/1998 | Foley et al. |
| 5,708,780 A | 1/1998 | Levergood et al. |
| 5,710,882 A | 1/1998 | Svennevik et al. |
| 5,721,908 A | 2/1998 | Lagarde et al. |
| 5,721,913 A | 2/1998 | Ackroff et al. |
| 5,727,129 A | 3/1998 | Barrett et al. |
| 5,734,709 A | 3/1998 | DeWitt et al. |
| 5,734,831 A | 3/1998 | Sanders |
| 5,742,762 A | 4/1998 | Scholl et al. |
| 5,742,763 A | 4/1998 | Jones |
| 5,742,768 A | 4/1998 | Gennaro et al. |
| 5,742,905 A | 4/1998 | Pepe et al. |
| 5,745,754 A | 4/1998 | Lagarde et al. |
| 5,754,830 A | 5/1998 | Butts et al. |
| 5,757,900 A | 5/1998 | Nagel et al. |
| 5,764,756 A | 6/1998 | Onweller |
| 5,768,501 A | 6/1998 | Lewis |
| 5,774,660 A | 6/1998 | Brendel et al. |
| 5,774,670 A | 6/1998 | Montulli |
| 5,778,178 A | 7/1998 | Arunachalam |
| 5,778,377 A | 7/1998 | Marlin et al. |
| 5,781,550 A | 7/1998 | Templin et al. |
| 5,781,632 A | 7/1998 | Odom |
| 5,787,160 A | 7/1998 | Chaney et al. |
| 5,787,412 A | 7/1998 | Bosch et al. |
| 5,790,780 A | 8/1998 | Brichta et al. |
| 5,790,789 A | 8/1998 | Suarez |
| 5,790,797 A | 8/1998 | Shimada et al. |
| 5,790,809 A | 8/1998 | Holmes |
| 5,793,762 A | 8/1998 | Penners et al. |
| 5,793,964 A | 8/1998 | Rogers et al. |
| 5,796,393 A | 8/1998 | MacNaughton et al. |
| 5,799,154 A | 8/1998 | Kuriyan |
| 5,802,320 A | 9/1998 | Baehr et al. |
| 5,805,803 A | 9/1998 | Birrell et al. |
| 5,812,533 A | 9/1998 | Cox et al. |
| 5,812,654 A | 9/1998 | Anderson et al. |
| 5,812,750 A | 9/1998 | Dev et al. |
| 5,815,080 A | 9/1998 | Taguchi |
| 5,815,665 A | 9/1998 | Teper et al. |
| 5,819,225 A | 10/1998 | Eastwood et al. |
| 5,819,271 A | 10/1998 | Mahoney et al. |
| 5,825,769 A | 10/1998 | O'Reilly et al. |
| 5,825,890 A | 10/1998 | Elgamal et al. |
| 5,826,029 A | 10/1998 | Gore, Jr. et al. |
| 5,826,269 A | 10/1998 | Hussey |
| 5,832,519 A | 11/1998 | Bowen et al. |
| 5,835,084 A | 11/1998 | Bailey et al. |
| 5,844,896 A | 12/1998 | Marks et al. |
| 5,845,067 A | 12/1998 | Porter et al. |
| 5,845,267 A | 12/1998 | Ronen |
| 5,848,233 A | 12/1998 | Radia et al. |
| 5,848,396 A | 12/1998 | Gerace |
| 5,848,399 A | 12/1998 | Burke |
| 5,850,517 A | 12/1998 | Verkler et al. |
| 5,852,810 A | 12/1998 | Sotiroff et al. |
| 5,852,812 A | 12/1998 | Reeder |
| 5,862,325 A | 1/1999 | Reed et al. |
| 5,867,495 A | 2/1999 | Elliott et al. |
| 5,870,558 A | 2/1999 | Branton, Jr. et al. |
| 5,875,236 A | 2/1999 | Jankowitz et al. |
| 5,875,296 A | 2/1999 | Shi et al. |
| 5,877,759 A | 3/1999 | Bauer |
| 5,881,237 A | 3/1999 | Schwaller et al. |
| 5,883,948 A | 3/1999 | Dunn |
| 5,884,032 A | 3/1999 | Bateman et al. |
| 5,884,312 A | 3/1999 | Dustan et al. |
| 5,892,900 A | 4/1999 | Ginter et al. |
| 5,907,681 A | 5/1999 | Bates et al. |
| 5,909,679 A | 6/1999 | Hall |
| 5,909,682 A | 6/1999 | Cowan et al. |
| 5,915,001 A | 6/1999 | Uppaluru |
| 5,920,542 A | 7/1999 | Henderson |
| 5,923,016 A | 7/1999 | Fredregill et al. |
| 5,923,756 A | 7/1999 | Shambroom |
| 5,930,764 A | 7/1999 | Melchione et al. |
| 5,930,804 A | 7/1999 | Yu et al. |
| 5,933,142 A | 8/1999 | LaStrange et al. |
| 5,937,165 A | 8/1999 | Schwaller et al. |
| 5,938,729 A | 8/1999 | Cote et al. |
| 5,949,976 A | 9/1999 | Chappelle |
| 5,953,389 A | 9/1999 | Pruett et al. |
| 5,956,714 A | 9/1999 | Condon |
| 5,958,016 A | 9/1999 | Chang et al. |

| | | |
|---|---|---|
| 5,960,411 A | 9/1999 | Hartman et al. |
| 5,961,602 A | 10/1999 | Thompson et al. |
| 5,963,925 A | 10/1999 | Kolling et al. |
| 5,966,695 A | 10/1999 | Melchione et al. |
| 5,970,467 A | 10/1999 | Alavi |
| 5,974,396 A | 10/1999 | Anderson et al. |
| 5,974,441 A | 10/1999 | Rogers et al. |
| 5,982,864 A | 11/1999 | Jagadish et al. |
| 5,982,891 A | 11/1999 | Ginter et al. |
| 5,983,350 A | 11/1999 | Minear et al. |
| 5,987,134 A | 11/1999 | Shin et al. |
| 5,987,523 A | 11/1999 | Hind et al. |
| 5,991,733 A | 11/1999 | Aleia et al. |
| 5,991,746 A | 11/1999 | Wang |
| 5,991,806 A | 11/1999 | McHann, Jr. |
| 5,995,948 A | 11/1999 | Whitford et al. |
| 5,999,525 A | 12/1999 | Krishnaswamy et al. |
| 5,999,965 A | 12/1999 | Kelly |
| 5,999,972 A | 12/1999 | Gish |
| 5,999,973 A | 12/1999 | Glitho et al. |
| 6,003,079 A | 12/1999 | Friedrich et al. |
| 6,006,265 A | 12/1999 | Rangan et al. |
| 6,011,844 A | 1/2000 | Uppaluru et al. |
| 6,012,090 A | 1/2000 | Chung et al. |
| 6,014,647 A | 1/2000 | Nizzari et al. |
| 6,014,702 A | 1/2000 | King et al. |
| 6,018,768 A | 1/2000 | Ullman et al. |
| 6,021,409 A | 2/2000 | Burrows |
| 6,023,762 A | 2/2000 | Dean et al. |
| 6,029,182 A | 2/2000 | Nehab et al. |
| 6,031,904 A | 2/2000 | An et al. |
| 6,032,132 A | 2/2000 | Nelson |
| 6,032,184 A | 2/2000 | Cogger et al. |
| 6,041,325 A | 3/2000 | Shah et al. |
| 6,041,357 A | 3/2000 | Kunzelman et al. |
| 6,044,144 A | 3/2000 | Becker et al. |
| 6,044,362 A | 3/2000 | Neely |
| 6,049,602 A | 4/2000 | Foladare et al. |
| 6,049,786 A | 4/2000 | Smorodinsky |
| 6,052,450 A | 4/2000 | Allison et al. |
| 6,058,170 A | 5/2000 | Jagadish et al. |
| 6,058,381 A | 5/2000 | Nelson |
| 6,064,667 A | 5/2000 | Gisby et al. |
| 6,065,002 A | 5/2000 | Knotts et al. |
| 6,065,059 A | 5/2000 | Shieh et al. |
| 6,065,116 A | 5/2000 | Isaacson et al. |
| 6,072,493 A | 6/2000 | Driskell et al. |
| 6,073,105 A | 6/2000 | Sutcliffe et al. |
| 6,073,122 A | 6/2000 | Wool |
| 6,073,241 A | 6/2000 | Rosenberg et al. |
| 6,078,891 A | 6/2000 | Riordan et al. |
| 6,078,924 A | 6/2000 | Ainsbury et al. |
| 6,084,953 A | 7/2000 | Bardenheuer et al. |
| 6,085,171 A | 7/2000 | Leonard |
| 6,085,190 A | 7/2000 | Sakata |
| 6,088,451 A | 7/2000 | He et al. |
| 6,088,796 A | 7/2000 | Cianfrocca et al. |
| 6,091,808 A | 7/2000 | Wood et al. |
| 6,094,655 A | 7/2000 | Rogers et al. |
| 6,104,704 A | 8/2000 | Buhler et al. |
| 6,104,716 A | 8/2000 | Crichton et al. |
| 6,105,131 A | 8/2000 | Carroll |
| 6,108,700 A | 8/2000 | Maccabee et al. |
| 6,108,782 A | 8/2000 | Fletcher et al. |
| 6,112,238 A | 8/2000 | Boyd et al. |
| 6,112,242 A | 8/2000 | Jois et al. |
| 6,115,040 A | 9/2000 | Bladow et al. |
| 6,115,458 A | 9/2000 | Taskett |
| 6,115,693 A | 9/2000 | McDonough et al. |
| 6,115,737 A | 9/2000 | Ely et al. |
| 6,118,780 A | 9/2000 | Dunn et al. |
| 6,119,109 A | 9/2000 | Muratani et al. |
| 6,122,258 A | 9/2000 | Brown |
| 6,128,624 A | 10/2000 | Papierniak et al. |
| 6,130,933 A | 10/2000 | Miloslavsky |
| 6,131,095 A | 10/2000 | Low et al. |
| 6,131,116 A | 10/2000 | Riggins et al. |
| 6,134,584 A | 10/2000 | Chang et al. |
| 6,137,869 A | 10/2000 | Voit et al. |
| 6,144,727 A | 11/2000 | Mashinsky |
| 6,145,001 A | 11/2000 | Scholl et al. |
| 6,154,744 A | 11/2000 | Kenner et al. |
| 6,161,102 A | 12/2000 | Yanagihara et al. |
| 6,161,126 A | 12/2000 | Wies et al. ................. 709/203 |
| 6,161,128 A | 12/2000 | Smyk |
| 6,163,597 A | 12/2000 | Voit |
| 6,173,311 B1 | 1/2001 | Hassett et al. |
| 6,182,113 B1 | 1/2001 | Narayanaswami |
| 6,205,456 B1 | 3/2001 | Nakao |
| 6,212,506 B1 | 4/2001 | Shah et al. |
| 6,212,546 B1 | 4/2001 | Starkovich et al. |
| 6,212,558 B1 | 4/2001 | Antur et al. |
| 6,240,450 B1 | 5/2001 | Sharples et al. |
| 6,253,239 B1 | 6/2001 | Shklar et al. |
| 6,275,490 B1 | 8/2001 | Mattaway et al. |
| 6,286,050 B1 | 9/2001 | Pullen et al. |
| 6,292,481 B1 | 9/2001 | Voit et al. |
| 6,295,551 B1 | 9/2001 | Roberts et al. |
| 6,337,858 B1 | 1/2002 | Petty et al. |
| 6,377,993 B1 | 4/2002 | Brandt et al. |
| 6,411,684 B1 | 6/2002 | Cohn et al. ............... 379/88.14 |
| 6,587,836 B1 | 7/2003 | Ahlberg et al. |
| 6,597,685 B2 * | 7/2003 | Miloslavsky et al. ....... 370/352 |
| 6,598,167 B2 | 7/2003 | Devine et al. |
| 6,606,708 B1 | 8/2003 | Devine et al. |
| 6,615,258 B1 | 9/2003 | Barry et al. |
| 6,631,402 B1 | 10/2003 | Devine et al. |
| 6,715,080 B1 | 3/2004 | Starkovich et al. |
| 6,760,844 B1 | 7/2004 | McCarthy et al. |
| 6,763,376 B1 | 7/2004 | Devine et al. |
| 6,782,425 B1 | 8/2004 | Germscheid et al. |
| 2001/0001014 A1 | 5/2001 | Akins, III et al. |
| 2001/0003828 A1 | 6/2001 | Peterson et al. |
| 2004/0139178 A1 | 7/2004 | Mendez et al. |

FOREIGN PATENT DOCUMENTS

| | | |
|---|---|---|
| EP | 0 809 387 | 5/1997 |
| JP | 09-064870 A | 3/1997 |
| WO | 97/11443 | 3/1997 |
| WO | 97/16911 | 5/1997 |
| WO | 97/18515 | 5/1997 |
| WO | 97/23988 | 7/1997 |
| WO | 98/19472 | 5/1998 |
| WO | 99/01826 | 1/1999 |
| WO | WO 00/11573 | 3/2000 |

OTHER PUBLICATIONS

Burch, B., "AT&T, MCI to release new magagement tools", *Network World*, Jan. 17, 1994, p. 19.
Chapman, D. Brent et al., "Building Internet Firewalls", Nov. 1995, O'Reilly & Associates, p. 58.
Low, C., "Integrating Communication Services", *IEEE Communication Magazine*, Jun. 1997, p. 164169, Jun. 1997.
Meteorology; [9] Databases, "Inforonics offers controlled access to Web Meteorology", Information Today, Apr. 1997, vol. 14 Issue 4, p. 53, 2p. This article reports that Inforonics has developed a controlled access gateway to MGA (Meteorological and Geoastrophysica).
"User's Guide: Microsoft Access", Microsoft Corporation 1994, pp. 378,594,599, 630-632 (13).
"McAfee's New 'Self-Service' Help Desk Web Suite Makes PCs Help Desk-Ready", Newswire Association Inc., Oct. 13, 1997.
Niemeyer, R., "Using Web Technologies in Two MLS Environments: A Security Analysis." *IEEE*, pa 205214. 1997.

Porter, T., "MCI offers tracking system", *Service News*, Apr. 1994, p. 17.

Rosen, Michele, "RPCS steps into new millennium", Midrange Systems; Spring House; May 10, 1996. This article informs about the new release of BPCS Client/Server Software as the most extensive upgrade of the product since 1980s. It incorporates onject tech.

Shklar, L., et al., "MetaMagic: Generating Virtual Web Sites Through Data Modeling," http://www.scope.gmd.de/info/www6/posters/714/poster734,html.

Tanenbaum, A., *Computer Networks*, pp. 410-412.

Vizard, M., "MCI to Pilot Convergence Billing Service", *Infoworld*, v. 18, Issue 37, Sep. 1996.

Yager, T., "Mixed Messages", *UNIX Review*, v. 16, No. 2, p. 29, Feb. 1998.

XTTR6.3 (Broadway) Overview. http://www.x.org/broadway.htm.

"Carriers Improve Net Management Services", *Communications Week*, p. 74.

"Network management; new software platform enhances.,", Product Announcement, *Edge, on & about AT&T*, v. 10, No. 375. p. 11(1).

"New software platform enhances network management capabilities. . . ", *Business Wire*, p. 9281122.

Clow, G., "Stac Unveils Windows NT 4.0 and Web Browser Support in New ReachOut 7", Feb. 12, 1997 http://www.stac.com/news/pressrel/pr_ro_unveil.html.

Jainschigg, J., "Billing confirmed: this easy-to-use box turns guest calls into revenue." *Teleconnect*, vol. 12, No. 9, p. 39(4).

Quadri et al., Hewlett-Packard and Cisco Systems, "Internet Usage Platform" White Paper.

"HP and Cisco Deliver Internet Usage Platform and Billing and Analysis Solutions, New Platform and Solutions Allow ISPs and Carriers to Offer Value-added Services" http://www.cisco.com/warp/public/146/pressroom/1998/apr98/28.htm.

HP Smart Internet, "Transform User Data Into Revenue".

HP Smart Internet Usage Analysis Solution, "Transform User Data Into Competitive Advantage".

HP/Cisco, Internet Usage Platform, "Transforming Internet Services Into Revenue" © Hewlett-Packard Co. 1998[16].

"Release Note for Netflow FlowCollector Release 2.0" © Jul. 1998 and "Release Notes for Netflow FlowAnalyzer Release 1.0" © Sep. 1997[16].

HP Invent, "Capturing the Usage Billing Advantage"http://www.hp.com/commmunications/usage/infolibrary/whitepapers/dsforum_print.html[16].

He, Taniguchi, "Internet Traffic Control and Management Architecture", IEEE, Oct. 22-24, 1998, pp. s46-03-1—s46-03-5.

Sixth International Conference on Network Protocols, IEEE, Technical Communication Services, Oct. 13-16, 1998, Table of Contents[4].

Markovich, Robert,"WAN Service Level Management Could Keep Your Feet Out of the Fire, Ensure Carriers Dilligence", Network World, Jul. 7, 1997.

Inoue et al., "Secure Mobile IP Using Security Primitives", IEEE 1997.

Anonymous, "Call Accounting Products", Teleconnect, vol. 15, No. 3, p. 89, Mar. 1997.

Deixler, Lyle, "Call Accounting Update", Teleconnect, vol. 15, No. 10, p. 87, Oct. 1997.

Deixler, Lyle, "Micro-Tel's Microcall for Windows 95/NT", Teleconnect, vol. 15, No. 12, p. 35, Dec. 1997.

Kenney, Kathleen. "American Management Systems Laurces Internet-Based Customer Care and Billing Tool for Telecom Firms", PR Newswire, New York, Oct. 9, 1996, extracted from http://proquest.umi.com on internet Feb. 28, 2002.

Morgan, Rick, "When Used Right, Internet can be Effective Marketing Tool", Madison Capital Times, Madison, WI, Nov. 8, 1996, extracted from http://proquest.umi.com on internet on Feb. 28, 2002.

Edwards, Morris, "The Electronic Commerce Juggernaut", Communication News, Nokomis, Sep. 1997, vol. 34, Issue 9, extracted from http://proquest.umi.com on Internet on Feb. 28, 2002.

"Cryptography and the Internet", www.echonyc.com/~ysue/crypt.html, 1995.

Lee et al., "Supporting Multi-User, Multi-Applet Workspaces in CBE", Computer Supported Cooperative Work 1996, Cambridge, MA.

"Netscape 2.0 Beta Hip or Hype?", www.plant.net.au/innovations/20beta.html, Planet Internet, 1995.

"Help-Desk Market Seeks Suite Success", Computer Reseller News, Jan. 5, 1998, p. 49.

\* cited by examiner

INTEGRATED CUSTOMER WEB STATION FOR WEB BASED CALL MANAGEMENT

REALTED APPLICATIONS

The present application is a continuation of U.S. patent application Ser. No. 09/945,589 filed on Sep. 4, 2001 now U.S. Pat. No. 6,956,845, which is a continuation of U.S. patent application Ser. No. 09/159,506 filed on Sep. 24, 1998 now U.S. Pat. No. 6,611,498 which claims priority from provisional Application Ser. No. 60/060,655 filed on Sep. 26, 1997; the contents of which are hereby incorporated by reference.

BACKGROUND OF THE INVENTION

1. Field of the Invention

The present invention relates in general to telecommunications management, and more particularly to a web-based application for controlling routing of inbound toll free telephone calls through a telecommunications network for automatic call distribution to service centers or other operations.

2. Background Art

Major telecommunications service entities, e.g., MCI, AT&T, and Sprint, presently provide network planning and configuration products for monitoring multiple systems or call centers to their customers predominantly through a Windows-based graphical user interface resident on their computer workstations. For example, MCI's configuration management and AT&T's routing control service both provide 3270 emulation packages that offer the customer the ability to dynamically control the routing of their toll free services. Via the existing products, customers may specify routing conditions such as a sequence of alternate sites or trunk groups where calls may be routed if a primary site is busy and already handling maximum calls allowed. Alternate routes are then searched in specified order looking for a site to take a call. Other products offer the ability to queue calls until a customer site is able to take a call. The length of the queue may be defined by a customer. Yet other products offer customers load balancing ability throughout a network, from a PC-based workstation at their sites.

MCI currently provides its customers with a call manager workstation for providing various call routing management capabilities, including the ability to: provision toll free numbers, destinations, automatic call distributor (ACD) information, automatic number identification (ANI) lists, routing groups, caller entered digits (CED) lists and user defined variables; display individual and agent group data; display termination cause values which are numeric codes that relate to a specific reason for routing a call, e.g., time out, normal routing, etc.; display system and application alarms; and display graphic or tabular ACD and regular peg-count data.

With the existing products, however, service entity customers typically need to directly dial-up, e.g., via a modem, or, alternatively, via dedicated communication lines, e.g., ISDN, T-1, etc., to the entity's application and database servers, and initiate the network management application through the graphical user interface (GUI). Frequently, a dial-up modem and communications software interact with each other in many ways which are not always predictable to a custom application, requiring extensive troubleshooting and problem solving for an enterprise desiring to make a legacy system available to the customer, particularly where various telephone exchanges, dialing standards or signal standards are involved In addition, the aforementioned software is very hardware specific, and customers generally have a wide range of workstation vendors, which requires extensive inventory for distribution, and generally, intensive customer hand holding through initial setup and installation before reliable and secure sessions are possible. If the customer's hardware platform changes through an upgrade, many of these issues need renegotiation. Accordingly, it is highly desirable to integrate the existing call management client-server application in a Web-based platform which provides expedient, comprehensive and more secure data access and reporting services to customers from any Web browser on any computer workstation anywhere in the world.

The present invention is one component of an integrated suite of customer network management and report applications using the Internet and a World Wide Web ("WWW" or "Web") Web browser paradigm. Introduced to the communications industry as the "networkMCI Interact," the integrated suite of Web-based applications provides an invaluable tool for enabling customers of a telecommunications enterprise to manage their telecommunication assets, quickly and securely, from anywhere in the world. In addition, the present invention has a capacity of functioning outside the integrated suite, i.e., as a standalone entity.

The popularity of the public Internet provides a measure of platform independence for the customer, as the customer can run his/her own Internet Web browser and utilize his/her own platform connection to the Internet to enable service. This resolves many of the platform hardware and connectivity issues in the customer's favor, and lets the customer choose their own platform and operating system. Web-based programs can minimize the need for training and support since they utilize existing client software, i.e. a Web browser, which the user has already installed and already knows how to use. Moreover, there is no longer a need to produce and distribute voluminous hard copies of documentation, including software user guides. Further, if the customer later changes that platform, then, as soon as the new platform is Internet enabled, service is restored to the customer. The connectivity and communications software burden is thus resolved in favor of standard and readily available hardware and the browser and dial-up software used to obtain the public Internet connection.

An Internet delivered paradigm obviates many of the installation and configuration problems involved with initial setup and configuration of a customer workstation, since the custom application required to interface with the legacy system can be delivered via the public Internet and run within a standard Web browser, reducing application compatibility issues to browser compatibility issues.

For the enterprise, the use of off-the-shelf Web browsers by the customer significantly simplifies the enterprise burden by limiting the client development side to screen layouts and data presentation tools that use a common interface enabled by the Web browser. Software development and support resources are thus available for the delivery of the enterprise legacy services and are not consumed by a need for customer support at the workstation level.

SUMMARY OF THE INVENTION

The present invention is directed to a call routing management application, including a routing management workstation, referred to herein as a call manager webstation (CMWS), which allows authorized customers to control toll free routing and monitor call center statuses. The terms call manager and call manager webstation will be used hereinafter and will refer to a system providing a call routing management capabilities. Via a web-based interface, customers may create and manage routing rules which may be applied on an individual call basis, monitor one or more call center automatic call distributor (ACD) agent groups, and view alarms. The present invention also provides reporting, data extract, and bulk data loading capabilities via a web-based interface.

The application features provided by the present invention include rules writing, testing and installation in which users are enabled to write rules for routing of toll free calls. Rules may load balance based on the call center capacity and route based on a calling number, caller-entered digits, or call termination quotas.

Furthermore, using the routing provisioning feature provided by the present invention, users may define tables and lists for use in routing rules. These tables include called numbers, destination labels, ACD agent groups, quota schemes, and ANI and/or CED translation tables.

Moreover, with the graphic data displays and alarms features provided by the present invention, users may view near real-time displays of call center ACD statistics and peg counts based on routing rules. Peg counts generally refer to a number of times an action or condition occurs. With the reports and data extracts feature, users may run provisioning and statistical reports on provisioning and statistical data as well as view, print, or extract files for further analysis.

The present invention also includes a user and business hierarchy maintenance feature for providing users with appropriate privileges with the ability to define business hierarchies, e.g., corporate or account group, to create and maintain user identifiers (ids), and to assign data access privileges.

In addition, the present invention supports multiple language displays, e.g., Canadian French, and a branding feature which enables use of call routing management capabilities internationally, e.g., in a North America service offering.

For providing the above functionalities, the present invention includes front-end client browser software including a web browser, HTML files including files within which scripts written in JavaScript client scripting language are embedded, and Java application and applet codes, which are executed on the customer's desktop system, i.e., a workstation. The Java classes providing the user interface include user and business hierarchy, call by call application, graphic data display, alarm manager, and reporting/data extraction, each of which provides a corresponding application feature supported by the present invention. The above client browser software physically resides on a web server and is downloaded dynamically to the customer's system via their web browser and an Internet connection.

The present invention also includes one or more web server(s) located in a demilitarized zone (DMZ) which is bounded by firewalls, for providing secure communications between the customer's workstation and the call manager webstation back-end systems. In addition, the web servers provide the state and session managements for the customer sessions. The web server classes implementing the web server functionalities include a session authentication manager for managing a customer session, and a transaction manager for receiving the web client transaction messages and communicating them to the back-end servers.

The present invention also includes a proxy server for servicing the client transactions which are communicated over the Internet via the web servers by interfacing with the systems implementing the routing engine and network elements which provide and direct various call routing procedures. The back-end also includes a plurality of databases having near real-time network statistics data and alarms extracted from the routing engine and/or network elements for providing reporting functionality to the customers at the client workstation. The proxy server is generally responsible for receiving and reformatting the web client transactions into commands compatible with the routing engine which may be implemented in a host system, and also for the reverse process, i.e., receiving the routing engine transactions and reformatting them into web client message transactions for transmitting them to the web client via the web servers, thereby providing services to both the web client and the routing engine. It should be further noted that the routine engine need not be implemented in a large scale mainframe system. Rather, the routing engine may be supported by various processors having a wide range of processing capabilities.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which like reference numbers indicate identical or functionally similar elements, and in which.

DETAILED DESCRIPTION OF THE PREFERRED EMBODIMENT OF THE INVENTION

An Overview of the Web-Enabled Integrated System

The present invention is one component of an integrated suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695, the nMCI Interact system architecture is basically organized as a set of common components comprising the following:

1) an object-oriented software architecture detailing the client and server based aspect of nMCI Interact;

2) a network architecture defining the physical network needed to satisfy the security and data volume requirements of the networkMCI System;

3) a data architecture detailing the application, back-end or legacy data sources available for networkMCI Interact; and 4) an infrastructure covering security, order entry, fulfillment, billing, self-monitoring, metrics and support.

Each of these common component areas will be generally discussed hereinbelow. A detailed description of each of these components can be found in a related, co-pending U.S. patent application U.S. Ser. No. 09/159,695 entitled INTEGRATED CUSTOMER INTERFACE SYSTEM FOR COMMUNICATIONS NETWORK MANAGEMENT, the disclosure of which is incorporated herein by reference thereto.

Figure 1:
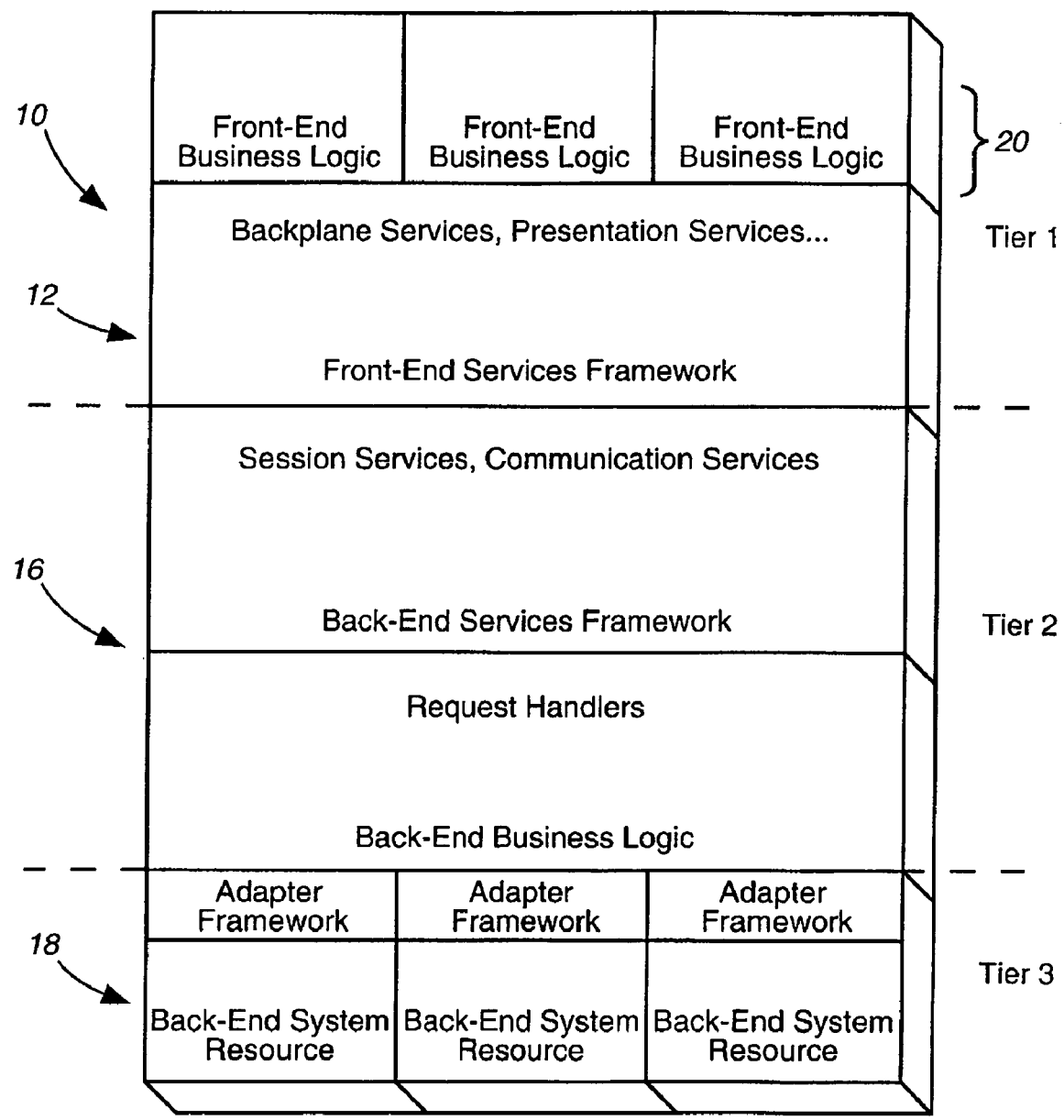
FIG. 1 illustrates the software architecture component comprising a three-tiered structure.

FIG. 1 is a diagrammatic illustration of the software architecture component in which the present invention functions. A first or client tier 10 of software services are resident on a customer workstation 10 and provides customer access to the enterprise system, having one or more downloadable application objects directed to front-end business logic, one or more backplane service objects for managing sessions, one or more presentation services objects for the presentation of customer options and customer requested data in a browser recognizable format and a customer supplied browser for presentation of customer options and data to the customer and for internet communications over the public Internet. Additional applications are directed to front-end services such as the presentation of data in the form of tables and charts, and data processing functions such as sorting and summarizing in a manner such that multiple programs are combined in a unified application suite. A second or middle tier 16, is provided having secure web servers and back-end services to provide applications that establish user sessions, govern user authentication and their entitlements, and communicate with adaptor programs to simplify the interchange of data across the network.

A third or back-end tier 18 having applications directed to legacy back-end services including database storage and retrieval systems and one or more database servers for accessing system resources from one or more legacy hosts.

Generally, as explained in U.S. Pat. No. 6,115,040, entitled GRAPHICAL USER INTERFACE FOR WEB ENABLED APPLICATIONS, the disclosure of which is incorporated herein by reference thereto, the customer workstation includes client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, toll free network management or call management functions. The system is capable of delivering to customers the functionality appropriate to their product mix.

Figure 2:
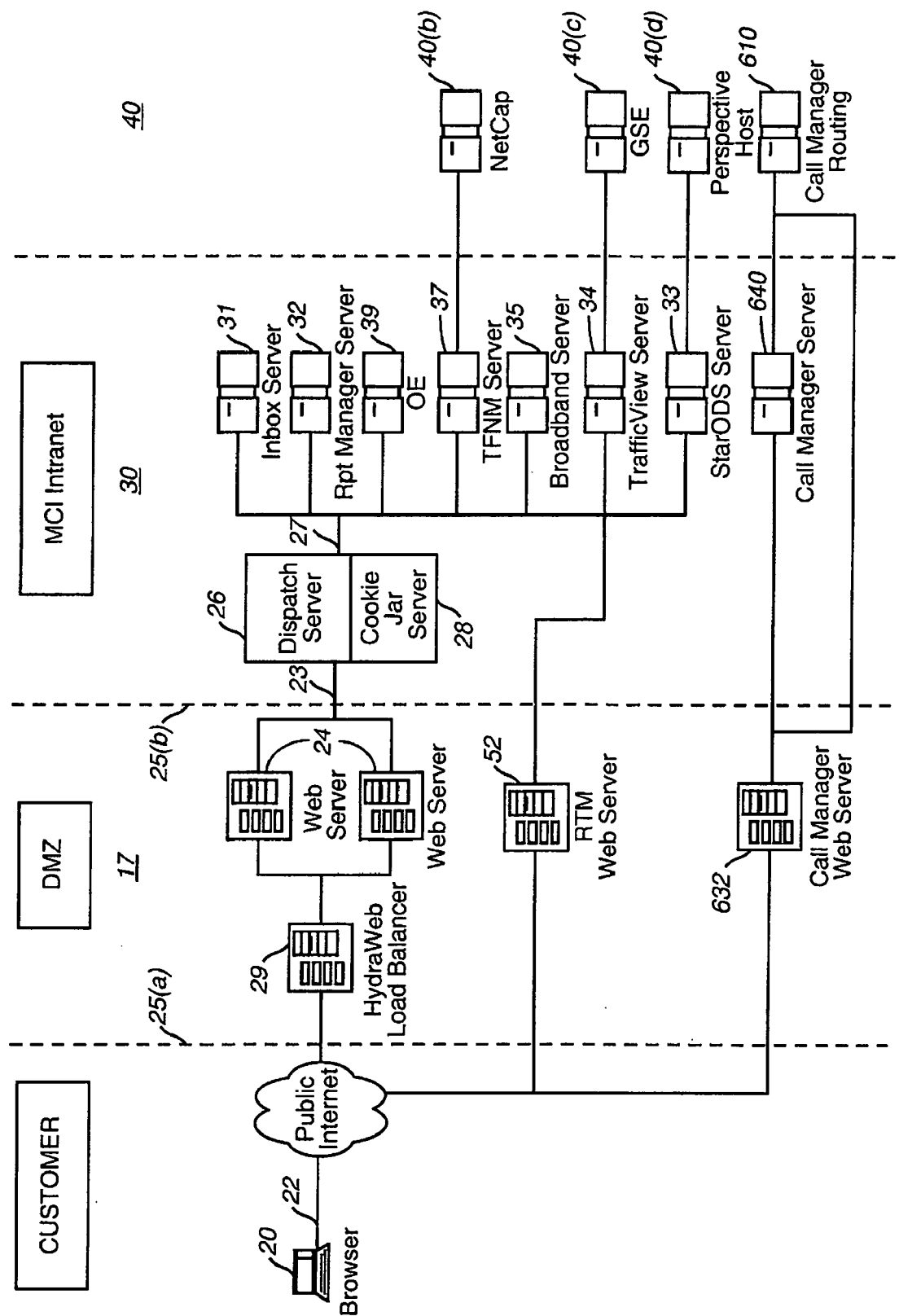
FIG. 2 is a diagrammatic overview of the software architecture of the networkMCI Interact system.

FIG. 2 is a diagrammatic overview of the software architecture of the networkMCI Interact system including: the Customer Browser (a.k.a. the Client) 20; the Demilitarized Zone (DMZ) 17 comprising a Web Servers cluster 24; the MCI Intranet Dispatcher Server 26; and the MCI Intranet Application servers 30, and the data warehouses, legacy systems, etc. 40.

Figure 3:
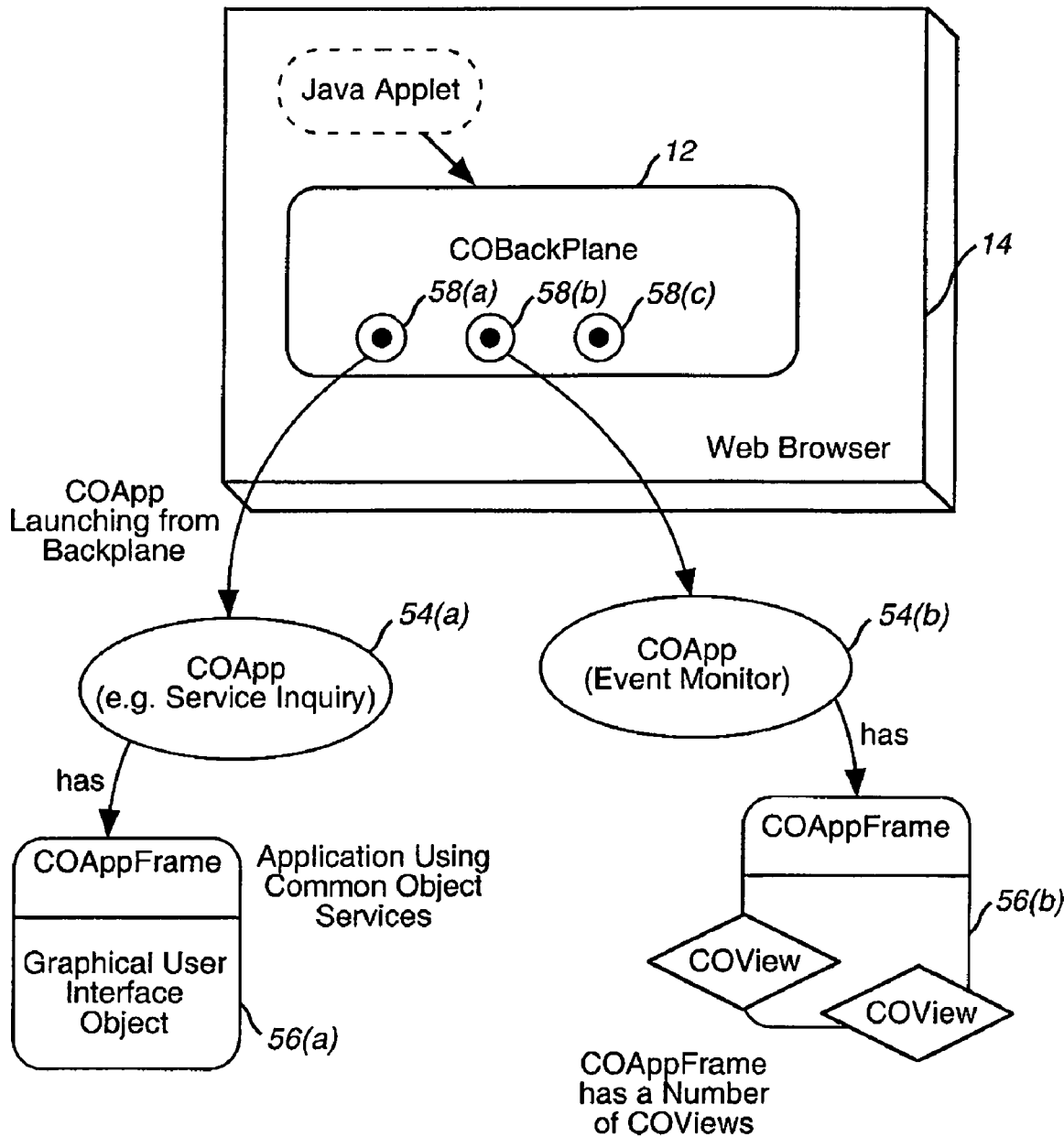
FIG. 3 is an illustrative example of a backplane architecture schematic viewed from a home page.

The Customer Browser 20, is browser enabled and includes client applications responsible for presentation and front-end services. Its functions include providing a user interface to various MCI services and supporting communications with MCI's Intranet web server cluster 24. As illustrated in FIG. 3, and more specifically described in the above-mentioned, U.S. Pat. No. 6,115,040 entitled GRAPHICAL USER INTERFACE FOR WEB ENABLED APPLICATIONS, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects that provide the front-end business logic. The backplane services layer 12 also manages the launching of the application objects. The networkMCI Interact common set of objects provide a set of services to each of the applications. The set of services include: 1) session management; 2)

application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

FIG. 3 is a diagrammatic example of a backplane architecture scheme illustrating the relationship among the common objects. In this example, the backplane services layer 12 is programmed as a Java applet which may be loaded and launched by the web browser 14. With reference to FIG. 3, a typical user session starts with a web browser 14 creating a backplane 12, after a successful log on. The backplane 12, inter alia, presents a user with an interface for networkMCI Interact application management. A typical user display provided by the backplane 12 may show a number of applications the user is entitled to run, each application represented by buttons depicted in FIG. 3 as buttons 58a,b,c selectable by the user. As illustrated in FIG. 3, upon selection of an application, the backplane 12 launches that specific application, for example, Service Inquiry 54a or Event Monitor 54b, by creating the application object. In processing its functions, each application in turn, may utilize common object services provided by the backplane 12. FIG. 3 shows graphical user interface objects 56a,b created and used by a respective application 54a,b for its own presentation purposes.

Figure 4:
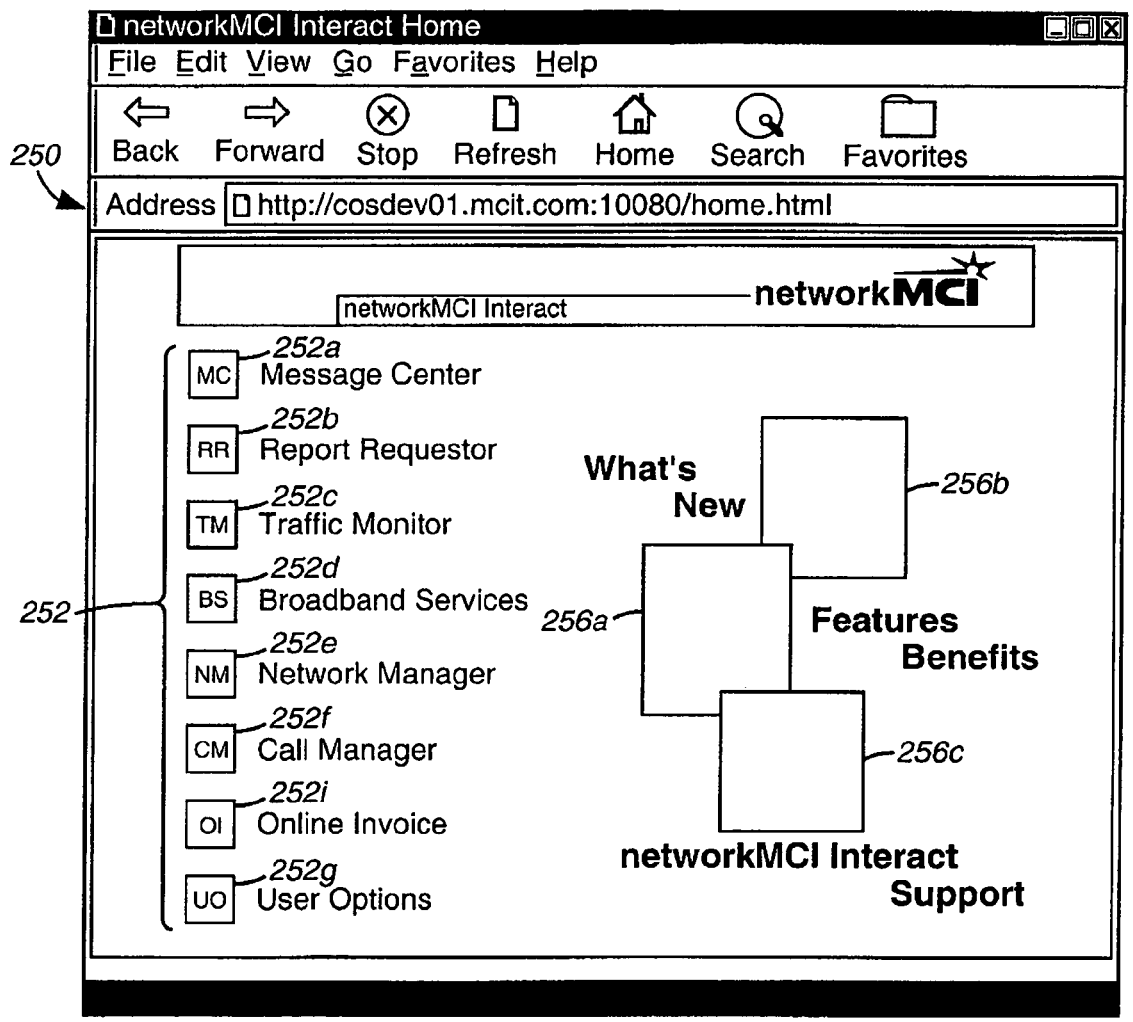
FIG. 4 illustrates an example client GUI presented to the client/customer as a browser web page.

FIG. 4 illustrates an example client GUI presented to the client/customer as a browser web page 250 providing, for example, a suite 252 of network management reporting applications including: MCI Traffic Monitor 252c; Call Manager 252f; a Network Manager 252e and Online Invoice 252i. Access to network functionality is also provided through Report Requester 252b, which provides a variety of detailed reports for the client/customer and a Message Center 252a for providing enhancements and functionality to traditional e-mail communications.

As shown in FIGS. 3 and 4, the browser resident GUI of the present invention implements a single object, COBackPlane which keeps track of all those client applications implemented as deriving from the COApp or COApplet classes, as will be described below. The COBackPlane object includes the capabilities to start, stop, and provide references to any one of these client applications. Additionally, a client application may be invoked from the home page (FIG. 4) by a direct URL launch. In this case, a new Web page having an applet providing the functionalities of the desired application may be retrieved and presented to the user from the home page (FIG. 4). The call manager of the present invention includes such an implementation for initiating the call manager client application.

The backplane 12 and the client applications use a browser 14 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm, and COAppFrame classes. COBackPlane 12 is an application backplane which launches the applications 54a, 54b, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods init( ), start( ), stop( ) and run( ). In the init( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp( ) method. The launched application then may use the backplane for inter-application communications, including retrieving Inbox data.

The COBackPlane 12 includes methods for providing a reference to a particular COApp, for interoperation. For example, the COBackPlane class provides a getApp( ) method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, copending application GRAPHICAL USER INTERFACE FOR WEB ENABLED APPLICATIONS.

As shown in FIG. 2, the aforesaid objects will communicate the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 re-encrypt the request using symmetric encryption and forward it over a second socket connection 23 to the dispatch server 26 inside the enterprise Intranet.

The DMZ is a special secure network area set aside exclusively for potentially hostile customer access. All DMZ equipment is physically isolated and firewalled from the enterprise Intranet. Similarly, the DMZ equipment is firewalled and obscured from hostile attacks from the public Internet, except for limited Web browser access to the Web servers which are located in the DMZ. The customer's Web browser connects to a Web server in the DMZ which in turn acts as a proxy to extract select information from midrange servers located in the enterprise Intranet. A customer never directly connects to servers in the enterprise, thus ensuring internal enterprise system security and integrity.

The DMZ acts as a double firewall for enterprise Intranet from the public Internet because the Web servers located in the DMZ never store or compute actual customer sensitive data. The Web servers only put the data into a form suitable for display by the customer's Web browser. Since the DMZ Web servers do not store customer data, there is a much smaller chance of any customer information being jeopardized in case of a security breach.

As described in greater detail in co-pending U.S. patent application Ser. No. 09/159,695 entitled SECURE CUSTOMER INTERFACE FOR WEB-BASED DATA MANAGEMENT, the contents and disclosure of which are incorporated by reference as if fully set forth herein, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 28 to generate a "cookie" which is a unique server-generated key that is sent to the client along with each reply to a HTTPS request. The client holds the cookie and returns it to the server as part of each subsequent HTTPS request. As desired, either the Web servers 24, the cookie jar server 28 or the Dispatch Server 26, may maintain the "cookie jar" to map these keys to the associated session. A separate cookie jar server 28, as illustrated in FIG. 2 has been found desirable to minimize the load on the dispatch server 26. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25*b* over a TCP/IP connection 23 to the dispatch server 26 on a new TCP socket while the original socket 22 from the browser is blocking, waiting for a response. The dispatch server 26 unwraps an outer protocol layer of the message from the DMZ services cluster 24, and re-encrypts the message with symmetric encryption and forwards the message to an appropriate application proxy via a third TCP/IP socket 27. While waiting for the proxy response all three of the sockets 22, 23, 27 block on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from the StarOE server 49 at logon time and cached.

If the requestor is authorized to communicate with the target service, the message is forwarded to the desired service's proxy. Each application proxy is an application specific daemon which resides on a specific Intranet server, shown in FIG. 2 as a suite of mid-range servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting services are acting as clients to the application servers providing the services. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages; a Report Manager proxy capable of communicating with a system-specific Report Manager server 32 for generation, management and receipt notification of customized reports; a Report Scheduler proxy for performing the scheduling and requests of the customized reports. The customized reports include, for example: call usage analysis information provided from the StarODS server 33; network traffic analysis/monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

As partially shown in FIG. 2, it is understood that each Intranet server of suite 30 communicates with one or several consolidated network databases which include each customer's network management information and data. As shown in FIG. 2, other legacy platforms 40(*b*), 40(*c*) and 40(*d*), 610 may communicate individually with the Intranet servers for servicing specific transactions initiated at the client browser. The illustrated legacy platforms 40(*b*)–(*d*), 610 are illustrative only and it is understood other legacy platforms may be interpreted into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the internet to the client workstation 10 via the Dispatch Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

As described herein, and in greater detail in co-pending U.S. patent application Ser. No. 09/159,695, the data architecture component of networkMCI Interact reporting system is focused on the presentation of real time (un-priced) call detail data, such as provided by MCI's TrafficView Server 34, and priced call detail data and reports, such as provided by MCI's StarODS Server 33 in a variety of user selected formats.

All reporting is provided through a Report Requestor GUI application interface which supports spreadsheet presentation, a variety of graph and chart type presentations, or both simultaneously. For example, the spreadsheet presentation allows for sorting by any arbitrary set of columns. The report viewer may also be launched from the inbox when a report is selected.

A common database may be maintained to hold the common configuration data which may be used by the GUI applications and by the mid-range servers. Such common data includes but are not limited to: customer security profiles, billing hierarchies for each customer, general reference data (states, NPA's, Country codes), and customer specific pick lists: e.g., ANI's, calling cards, etc. An MCI Internet StarOE server manages the data base for the common configuration of data.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data is typically resident in a Report Manager server database and managed by the report manager.

The Infrastructure component of the nMCI Reporting system includes mechanisms for providing secure communications regardless of the data content being communicated. As described in detail in above-referenced, co-pending U.S. patent application Ser. No. 09/159,695, the nMCI Interact system security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the nMCI Interact infrastructure includes order entry, which is supported by the Order Entry ("StarOE") server. The general categories of features to be ordered include: 1) Priced Reporting; 2) Real-time reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; and, 14) Online Invoicing.

The self-monitoring infrastructure component for nMCI Interact is the employment of mid-range servers that support SNMP alerts at the hardware level. In addition, all software processes must generate alerts based on process health, connectivity, and availability of resources (e.g., disk usage, CPU utilization, database availability).

The Metrics infrastructure component for nMCI Interact is the employment of mechanisms to monitor throughput and volumes at the Web servers, dispatcher server, application proxies and mid-range servers. Metrics monitoring helps in the determination of hardware and network growth.

To provide the areas of functionality described above, the client tier 10 is organized into a component architecture, with each component providing one of the areas of functionality. As explained in further detail in co-pending U.S. patent application Ser. No. 09/159,515, the client-tier software is organized into a "component" architecture supporting such applications as inbox fetch and inbox management, report viewer and report requestor, TFNM, Event Monitor, Broadband, Real-Time Monitor, and system administration applications. Further functionality integrated into the software architecture includes applications such as Outbound Network Manager, Call Manager, Service Inquiry and Online invoicing.

Call Manager Webstation Application

Figure 6:
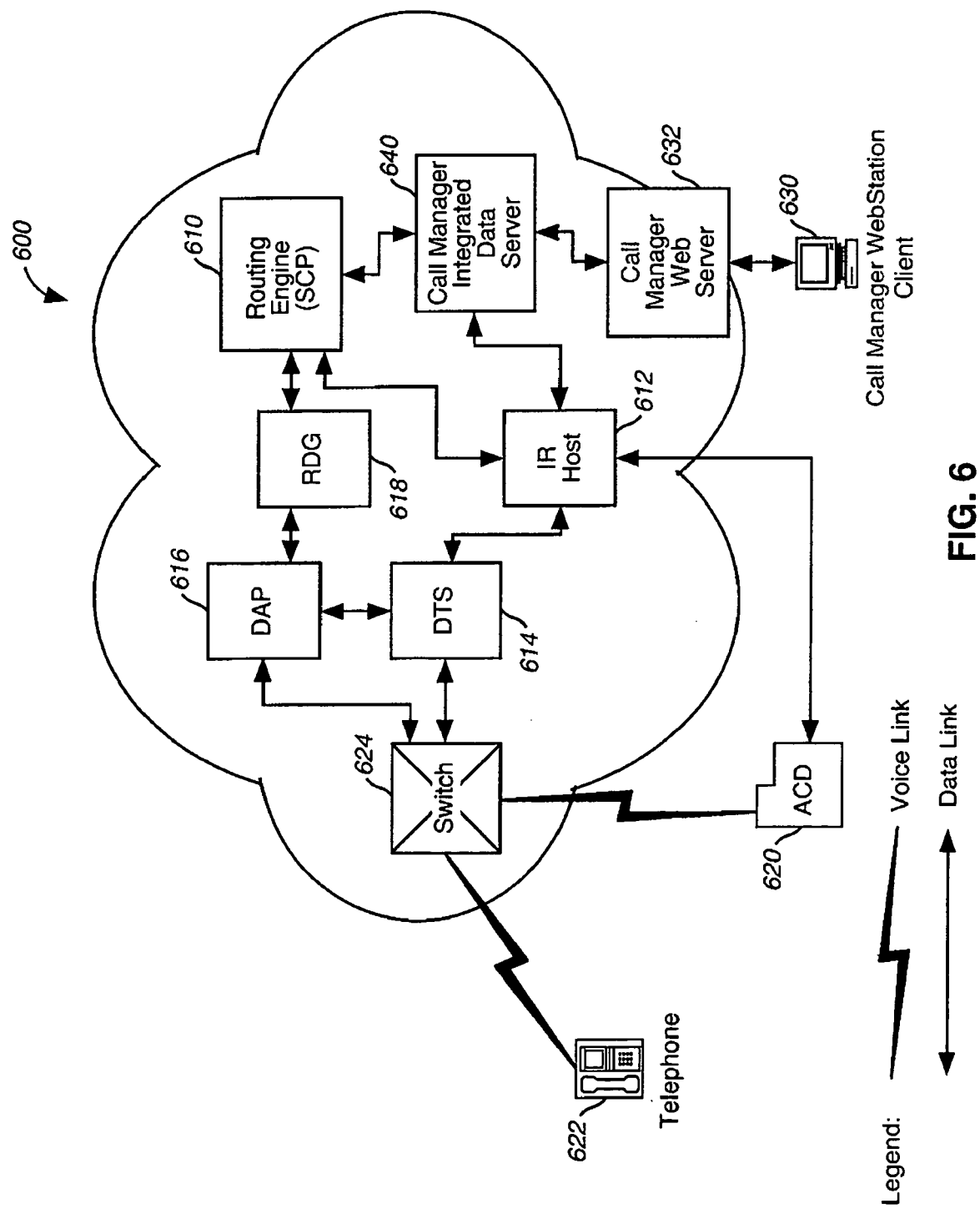
FIG. 6 illustrates a high level overview of the call manager system environment.

The call manager system or the present invention provides sophisticated mechanisms, e.g., intelligent call routing, for call center customers to control delivery of toll free calls from the telecommunications enterprise network to call centers, including call centers having multiple ACDs. Particularly, using the system of the present invention, the customers have the ability to define routing rules which, on an individual call basis, determine the best place to route incoming toll free calls. A high level overview of the call manager system environment is illustrated in FIG. 6. The call manager system generally includes: a service control point (SCP) 610, for providing call manager routing features, known as "call by call" routing; an intelligent routing host (IR host) 612; and client workstations, i.e., call manager webstation client 630. The SCP 610 is a routing engine which essentially maintains call routing rules and uses those rules to determine where to route the calls. The SCP 610 shown and described hereinafter, is used as an example of a system implementing the routing engine. It should be noted that the routing engine implementation is not limited to and need not reside in a mainframe system. Rather, the routing engine may also be supported by various types of processors having a wide range of processing capability.

A typical call processing flow for a call received from a caller 622 includes routing requests and responses from the enterprise switches 624 through data access points (DAPs) 616 and remote data gateways (RDGs) 618 into and out of the SCP 610. The DAP 616 executes a routing plan by translating a toll free number passed by the switch 624 into a network number, and maps it to an address. The RDG 618 provides a standard gateway allowing communication between the SCP 610 and the enterprise's backbone network. The translated network number is then communicated to the SCP 610 via the RDG 618.

Data collection and storage of ACD-based statistics from customer call centers and network statistics are supported by DAP traffic statistics (DTS) 614, and the IR host 612. The DTS collects network routing statistics from the DAP 616 and passes them to the IR host 612. The IR host 612 stores routing statistics from DTS 614 and the ACD 620. The ACD 620 data statistics are collected for each ACD 620 and normalized by the IR host 612, and provided to the routing engine, e.g., SCP 610. When the SCP 610 receives a routing request, the SCP 610 typically determines the best location to route a call by modeling each call center using periodic Automatic Call Distributor (ACD) 620 data statistics to keep the model in line with what is actually going on at each location.

Upon completion of call processing according to a customer routing plan, the DAP 616 passes routing instructions to the switch 624 for setting up the call to a customer's ACD 620. The ACD 620 balances the load of calls based upon customer defined rules such as the "busy-ness" of a call center. Calls may be distributed evenly using a "round robin" technique, or directed in which calls are routed based on a percentage allotted to each destination identifier. Voice communications are carried from the switch 624 to the ACD 620 which terminates the call at the appropriate trunk or destination identifier.

The routing capabilities supported by SCP 610 include a termination selection based upon one or more of the following: initial list of eligible destinations, destinations eliminated from consideration based upon tested conditions, artificially biased evaluation criteria, percent allocation, and manipulation of user-defined peg-counter variables. The SCP 610 also supports the routing and blocking of incoming calls using event-level data based on one or more of the following characteristics: day of the week, day of year, preference of destination choices, time of day, membership of the automatic number identification (ANI) or caller entered digits (CED) in a defined list of values, load balancing and/or availability at specific destinations, user-defined quota schemes, user-defined peg-counters, preference of destination choices, and artificial bias of load balancing algorithms.

The Call Manager Integrated Data Server(s) (CMIDS) 640 are included to provide a front-end functionality to the routing engine, e.g., SCP 610, and off-load various workstation-related processing from the routing engine. In addition, the CMIDS 640 may directly access data stored on the IR host or on other data servers. Further details of the CMIDS 640 will be described with references to FIGS. 7 and 10.

The call manager system of the present invention further includes one or more web servers 632 for providing browser-based customer connections from the World Wide Web (WWW or Web). The call manager web server 632 passes the customer connections through to the SCP 610 via the CMIDS 640, and thus delivers the call manager functionality to the call manager webstation client 630 via a standard web browser and the Internet.

The call manager webstation 630 may be any hardware/software platform connected to the public Internet and running a supported web browser, e.g., Internet Explorer V4.01. The call manager webstation 620 is typically owned and maintained by the customer. The call manager webstation 630 includes a web-based graphical user interface (GUI) application which enables the customers to define their call terminations, and provision routing rules and associated tabular data to control routing by the SCP 610. The GUI application also presents alarms and near real time graphical displays of peg counts and ACD-based statistics. The application also provides reports and data extracts of historical data, including call detail records (CDRs), ACD-based statistic, and peg counts. In addition, user-id administration functions including business hierarchy structures and function profiles may be performed via the call manager webstation's web-based GUI application.

Call Manager Webstation Architecture

Figure 7:
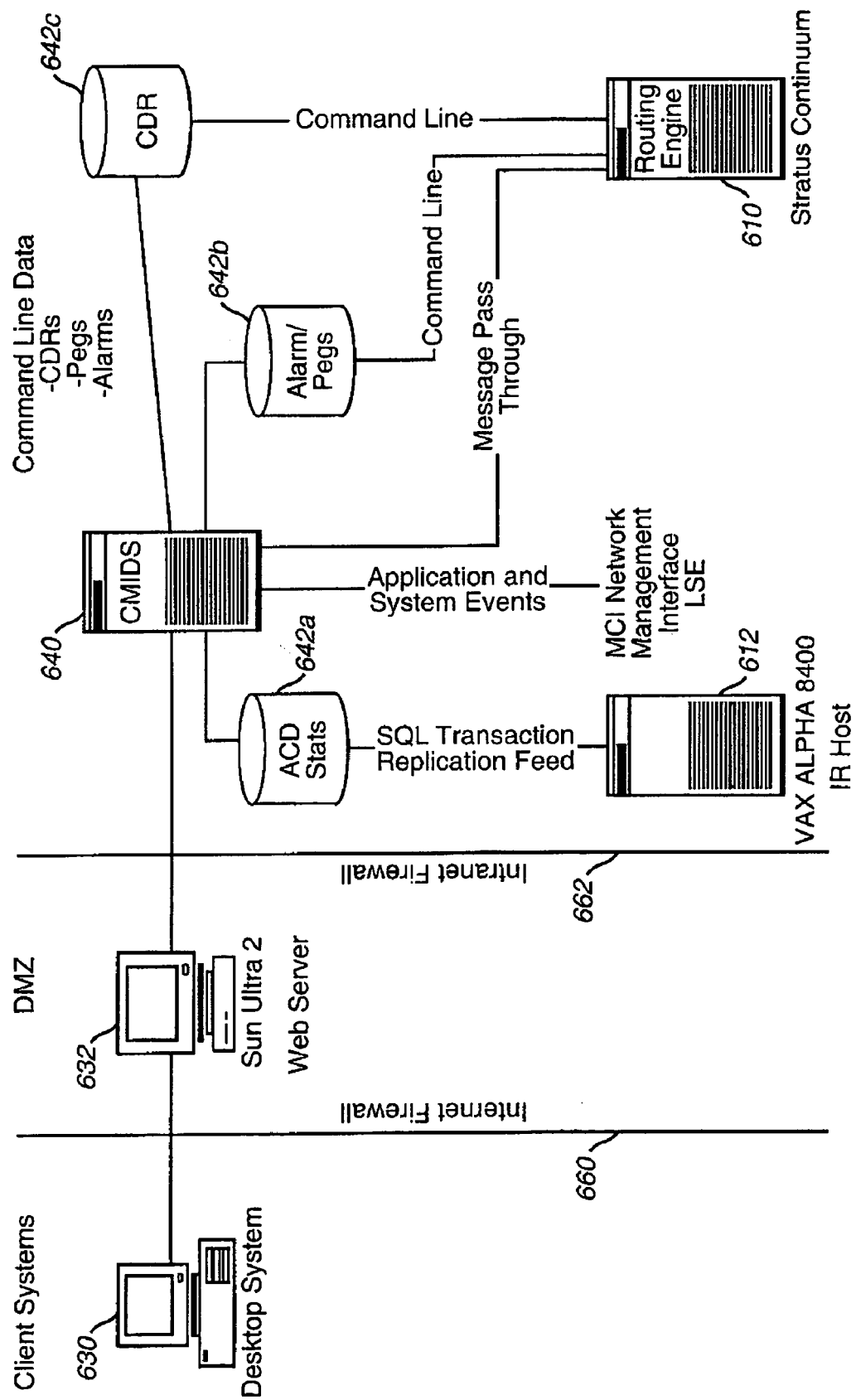
FIG. 7 illustrates call manager webstation component architecture of the present invention, showing interconnections among the components.

FIG. 7 illustrates the call manager webstation component architecture of the present invention, showing interconnections among the components. In a preferred embodiment, the call manager webstation system includes three components of the call manager platform: client desktop systems, or workstations, hereinafter referred to also as the client webstations 630 for delivering call routing management functions through a standard web browser; a web server 632 for supporting secure access for internet or extranet/intranet-based clients to call manager back-end and thus to the routing engine, e.g., SCP systems; and call manager integrated data server (CMIDS) 640, forming an integral part of the back-end call manager application and supporting access to the routing engine, e.g., SCP systems. As shown in FIG. 7, the client desktop systems 630 with Internet connectivity have standard browsers executing Java applets, hereinafter referred to also as a client GUI application, downloaded from the web server 632. The web server 632 which is located in the demilitarized zone (DMZ) of the network MCI Interact, include Java class files, but no storage of customer data to insure data security. Preferably, more than one web server may be provided for redundancy and fail-over capability. The DMZ is generally bounded by two firewalls: an Internet firewall 660 and an enterprise intranet firewall 662. The call manager integrated data server (CMIDS) generally handles the business and data logic associated with the call manager functionality. Each of the above components will now be described in detail with reference to additional figures.

As described above, the client webstation 630 provides a web-based graphical user interface (GUI) offering data management and data presentation features for the call manager system. The web-based front-end GUI is typically written using the Java programming language to insure platform independence. The client webstation 630 typically includes a web browser with Java applets for the interface for providing access to the call manager webstation application from a standard web browser, e.g., Internet Explorer V4.01. In addition, the networkMCI Interact common objects, described in the U.S. Pat. No. 6,115,040, the contents and disclosure of which are incorporated by reference as if fully set forth herein, are used for implementing many functions needed for client/server communications protocols. The Java applets generally reside on the web servers 632 and are dynamically downloaded to the client browsers (client webstations) 630 when the Uniform Resource Locator (URL) for the call manager webstation client GUI application is accessed.

Figure 13:
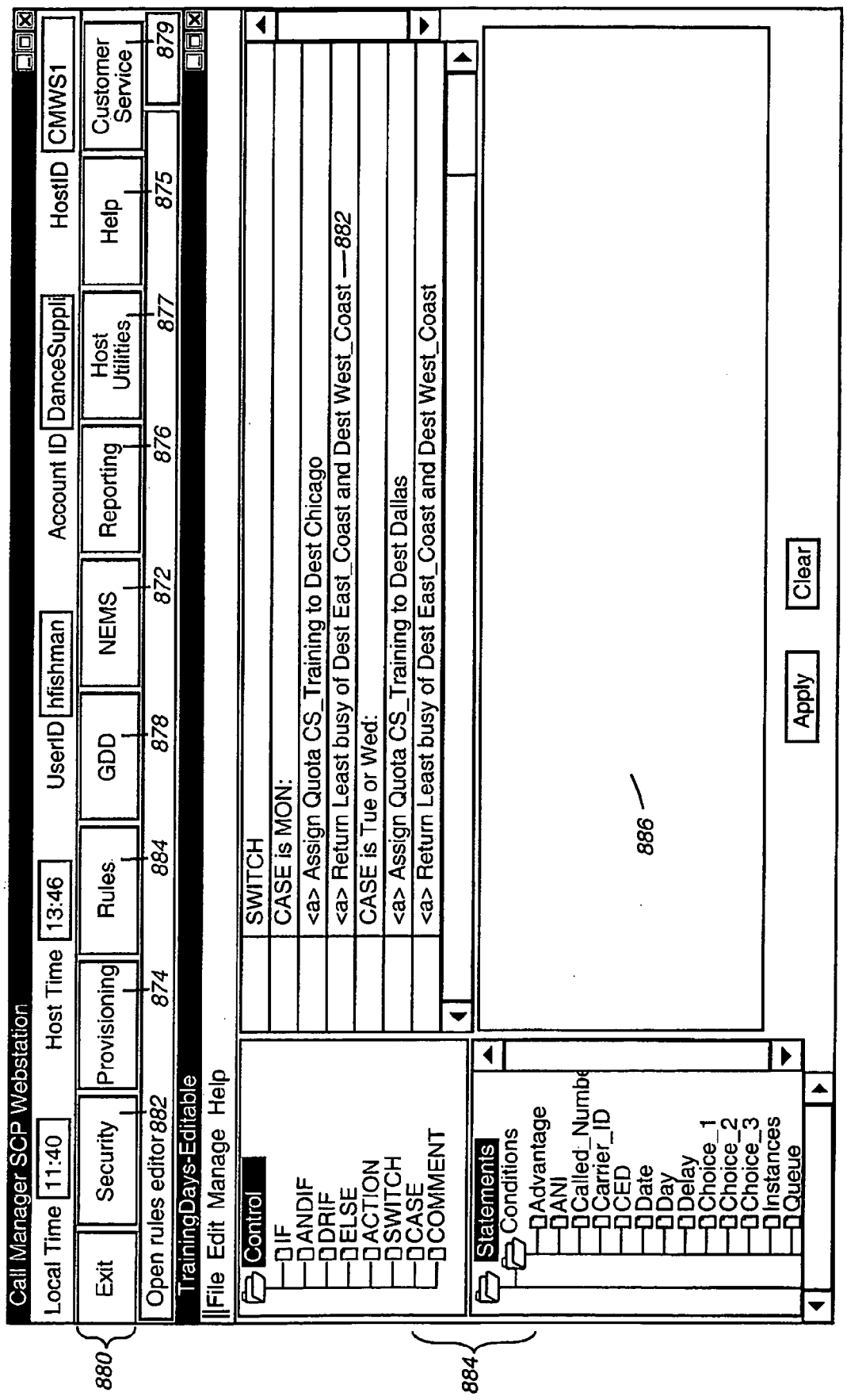
FIG. 13 illustrates an example of a call manager webstation application screen including the toolbar and the rule writing palette.

The call manager webstation client GUI application of the system of the present invention is invoked by clicking an icon labeled "call manager" (FIG. 4 at 252*f*) from the networkMCI Interact home page (FIG. 4). The customer is then presented with a toolbar for launching each of the call manager webstation application features (FIG. 13 at 880). Moreover, on-line help is offered via hyper-text markup language (HTML) documents residing on the web servers 632. Furthermore, the displays, including the on-line help may be presented to the customers in a language chosen by the customer or in a language of the geographic locale, e.g., English, or French.

Each call manager webstation application feature may be accessed through an icon button on a tool bar (FIG. 13 at 880). Moreover, each feature is brought up in a separate window frame, giving a consistent look and feel throughout the web environment. The main features offered include:

user setup and administration, i.e., security functions (FIG. 13 at 882); business hierarchy setup; call by call application for rules writing and provisioning (FIG. 13 at 874, 884); graphic data display (FIG. 13 at 878); alarm manager (FIG. 13 at 872); reporting and data extracts (FIG. 13 at 876); and host utilities (FIG. 13 at 877). A detailed description for each of feature will be provided with reference to FIG. 12 below.

Figure 9:
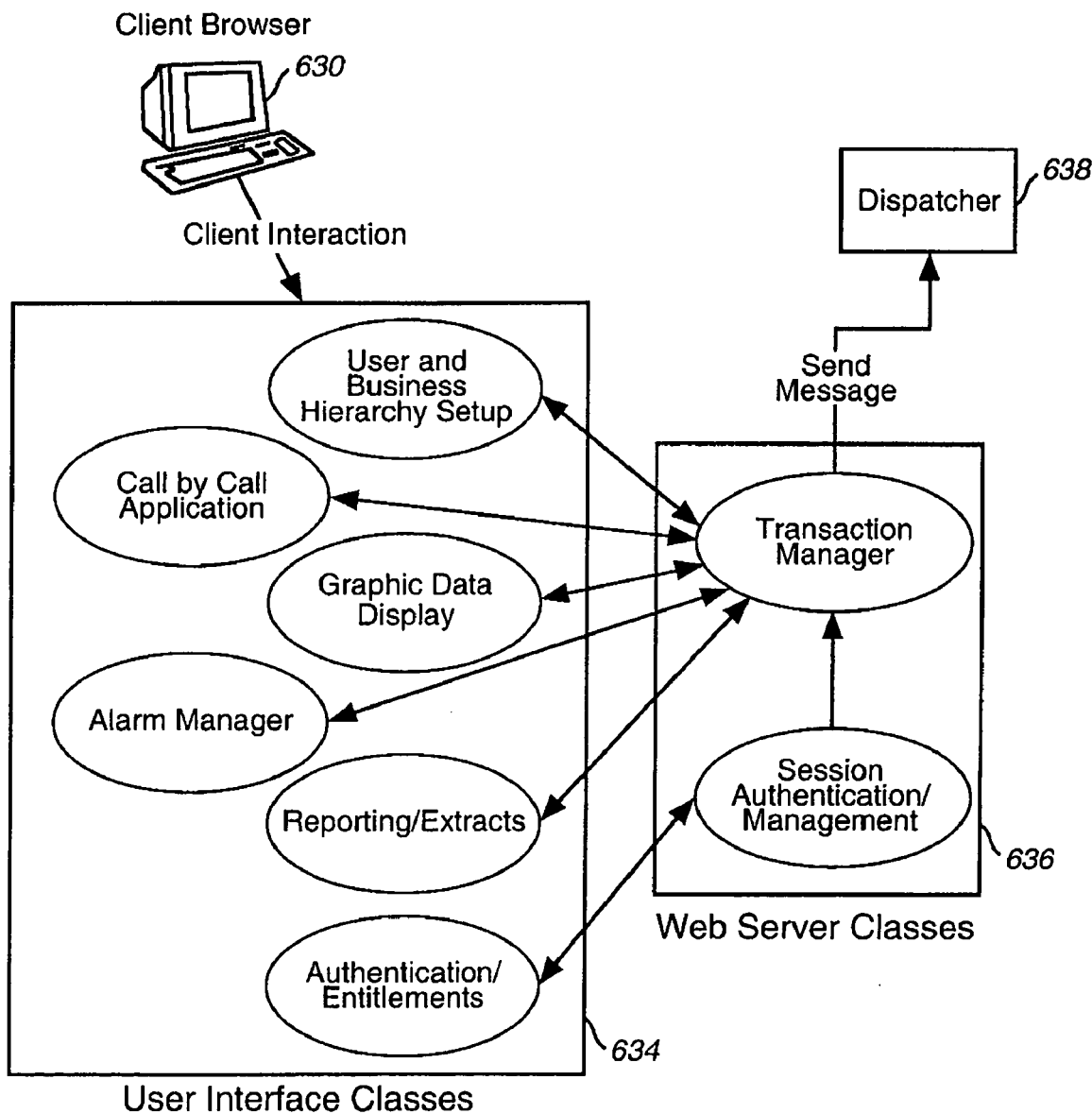
FIG. 9 illustrates the typical objects making up the client interface code, in one embodiment of the present invention.

For providing the above features, the client browser includes class objects shown in FIG. 9. FIG. 9 illustrates the typical objects making up the client interface code in one embodiment of the present invention. The user interface classes 634 represent the main GUI objects for performing call manager specific functionality. Each of the classes, i.e., user and business hierarchy setup, call by call application, graphic data display, alarm manager, reporting extracts, and authentication/entitlements, performs the corresponding client-side functionality associated with the call manager features provided. The web server classes 638 provide the communication pass through to the back-end server. The communication classes (not shown) are employed between the client browser 630 and the web server 632 for requesting transactions and/or data sets from the web server 632.

In one embodiment of the invention, the communications from the client 630 and back-end (FIG. 7 at 640) via the web server 632 are conducted using the common gateway interface (CGI). Requests from the client are typically first targeted at a CGI program, which then relays the request to the appropriate proxy process. Results are returned from back-end processes to the requesting client in the same manner. Each transaction or data request may be executed as a separate process, to allow processing to continue from other applications within the call manager webstation system.

In a preferred embodiment, a Netscape Server Application Program Interface (NSAPI) module may be used as an alternative to the CGI layer, the NSAPI module replacing the CGI-protocol communications layer between the client 630 and the web server 632. The web server 632 may be configured to pick up the NSAPI module and load on start up. Java client code 634 may be configured to refer to the NSAPI module. For example, the Java client may invoke a method to communicate directly with the NSAPI module that performs the same function as the CGI program. Using the NSAPI module enhances performance and messaging throughput. When the server 632 recognizes requests for the NSAPI module, it invokes a particular function in the module which performs essentially the same function as the CGI program. For example, a middle tier transaction handler, typically a message manager (msgmgr) and residing with the web servers 632, may be modified to use the NSAPI instead of the HTTP CGI. The advantage of NSAPI over CGI is that a new process need not be created whenever a request comes in from the web client 630.

Figure 8:
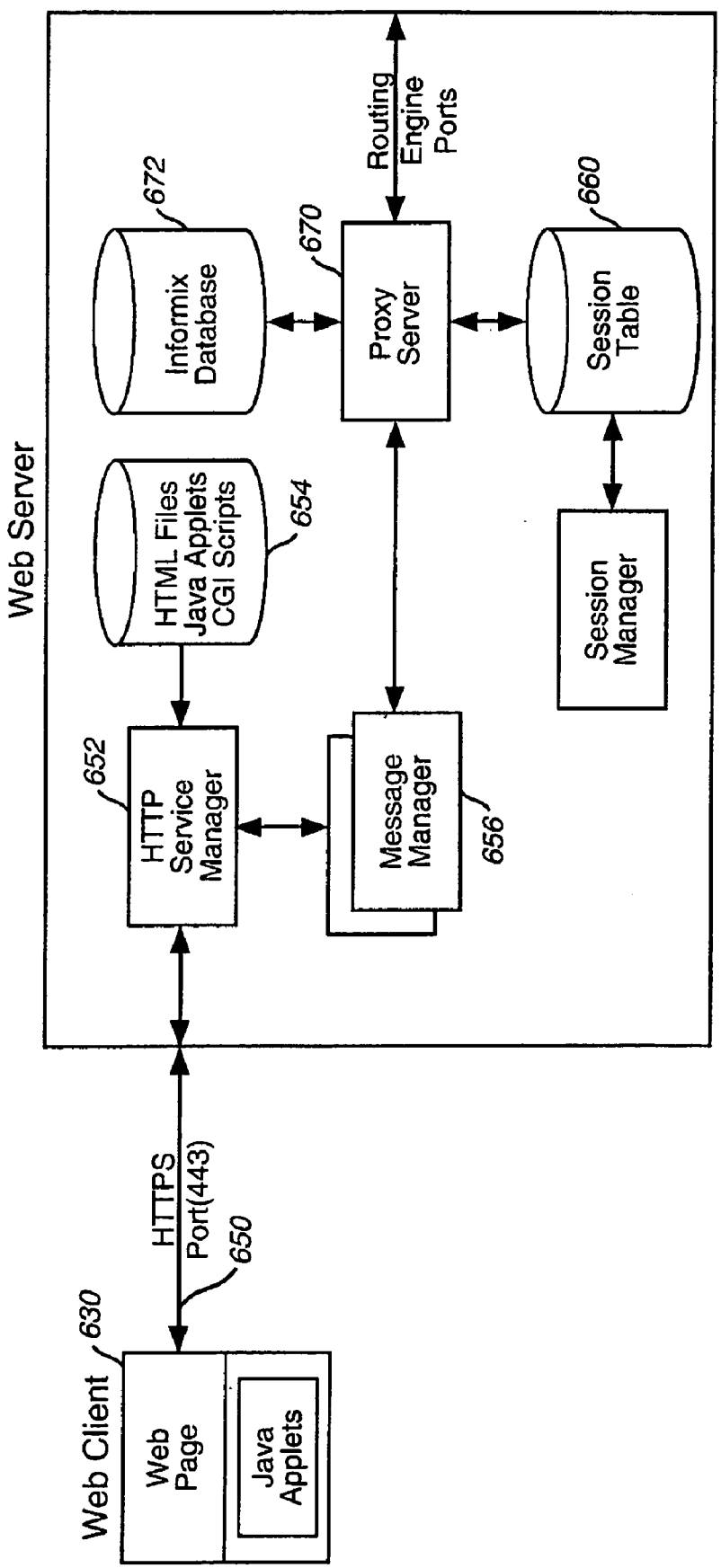
FIG. 8 illustrates one embodiment of the software architecture showing communications between the client 630 and the web server 632 and its components.

In general, and as described above, the web server 632 provides a communication pass-through between the web client GUI application 630 and the back-end call manager integrated data server (CMIDS) 640 which may communicate with the routing engine, e.g., SCP. FIG. 8 illustrates one embodiment of the software architecture showing communications between the client 630 and the web server 632 and its components. The web server 632 provides web-based call routing management applications to web clients having a web browser on their client workstations 630. The web server 632 includes an HTTP service manager 652 and a message manager 656. The HTTP service manager 652 generally handles requests from multiple clients 630 to download web pages and Java applets for display within a browser. Web pages include hypertext markup language (HTML) files and Java applets 654 that are downloaded to the clients 630 and are executed within a browser by the Java applets. The HTTP service manager 652 also handles message transactions via the POST method defined by the hyper-text transfer protocol (HTTP) protocol. The HTTP service manager may be standard off-the-shelf World Wide Web server software, e.g., Netscape Enterprise Server.

The message manager 656 is typically a CGI program that is executed as a spawned process within the HTTP service manager 652 when a message transaction is received from the client via the POST method sent to the HTTPS port (443) 650. The HTTP service manager 652 spawns a process to run an instance of the message manager 656 each time it receives a message transaction from the client. Alternately, the message manager 656 may be implemented as a function in the NSAPI module as described above. The HTTP service manager 652 then invokes the message function in the NSAPI module. Both input and output streams are created by the message manager 656 to receive message data from the client 630 and to reply back to the client 630. The message manager 656 is generally responsible for the following: 1) accepting new user log in by allocating a new session key for a newly created session; 2) attaching a dispatcher and proxy header to the web client's message and forwarding the message to the proxy server 670; and receiving a routing engine, e.g., SCP, response message from the proxy server 670 and re-wrapping this message with dispatcher and proxy header and sending this formatted message to the web client 630. Message transactions are sent to the proxy server 670 over a new connection by opening a new TCP socket to the proxy server 670 while the original socket from the browser is blocking, waiting for a response from the web server 632.

Typically, communications to and from the client 630 take place over hyper-text transfer protocol secure (HTTPS), which uses hyper-text transfer protocol (HTTP) over a secure socket layer (SSL) encrypted channel. Applications may include web pages in the form of hyper-text markup language (HTML) files and Java applets 654 that are stored on the web server 632. The HTTP service manager 652 downloads the HTML files and Java applets 654 to the client 630 upon request via the HTTPS port 650, typically configured to port number 443. Each transaction from a client 630 is sent to the web server 632 in the form of a logical message that has been encrypted. The web server 632 decrypts the message and wraps the message with the user's information, including environment variables and a server-generated session identifier (id). The message is then encrypted and forwarded to the CMID 640, or alternately, as will be described below, to the proxy server component of the CMID 640.

As described above, the message transactions created by the client 630 may be transmitted over HTTPS using the POST method defined within the HTTP protocol. Using the POST method, a specified CGI program and more specifically, an invoked message manager runs as a thread in the HTTP service manager 652. Message data is passed to the message manager 656 by opening an input stream and an output stream within the thread. As described previously, the HTTP service manager 652 spawns a message manager process 656 for each message transaction sent to web server 632. Each message transaction is a single request from the client 630 that is answered by a single reply from the web server 632.

The web server 632 also includes a session manager 658 and a session table 660 for providing session management functions including the authentication of various web requests. A session is defined as the amount of time between which a client 630 logs onto the web server 632 and when the client logs off. During a session, a client 630 may submit many message transactions to the web server 632. State data for each session is stored in the session table 660. Session entries are deleted from the session table 660 when a user logs off or when a session is aged. Each message transaction received by the web server 632 is associated with an active session. If a session no longer exists for a particular transaction, the message transaction is returned to the client 630 as rejected. The application then may prompt the user to login again.

Generally, the session table 660 is a table that has state information on all current client sessions that are active on the web server 632. When a client logs onto the web server 632 and is authenticated, the client is provided a "session id" which is a unique server-generated key. The client holds this and returns it to the server as part of subsequent message transaction. The session table 660 maintains a "session key table" which maps these keys to the associated session. The session table also includes a time stamp for each client session. A client session's time stamp is updated each time a message transaction containing the session id for the session is received. A session is aged if no message transactions belonging to the session are seen after a given amount of time. If so, the session, with its entry deleted from the session table 660, is logged off from the SCP 610.

The session manager 658 is generally responsible for monitoring all current client sessions. The session manager 658 typically monitors the sessions by accessing the session table 660 and checking the current time stamp values for each current session. If the time stamp value shows that a session has aged, the session entry for the aged session is cleared from the session table 660. Clearing the session entry forces any further message transactions associated with the session identifier to be rejected, requiring the user to restart the session.

For communications to and from the web client 630 and the back-end, the middle-tier web server 362 supports three types of transport mechanism which are provided by the networkMCI Interact platform: synchronous, asynchronous, and bulk transfer. The Synchrous transaction type typically has a single TCP connection which is kept open until a full message reply has been retrieved. The Asynchronous transaction type is typically used for handling message transactions requiring a long delay in the back-end server response. A server process handling the message transaction responds back to the web client 630 immediately with a unique transaction identifier and then closes the connection. The web client 630 may then poll the web server 632 using the transaction identifier to determine when the original message transaction has completed. The bulk transfer type of transport mechanism is typically used for large data transfers which may be virtually unlimited in size.

Figure 5:
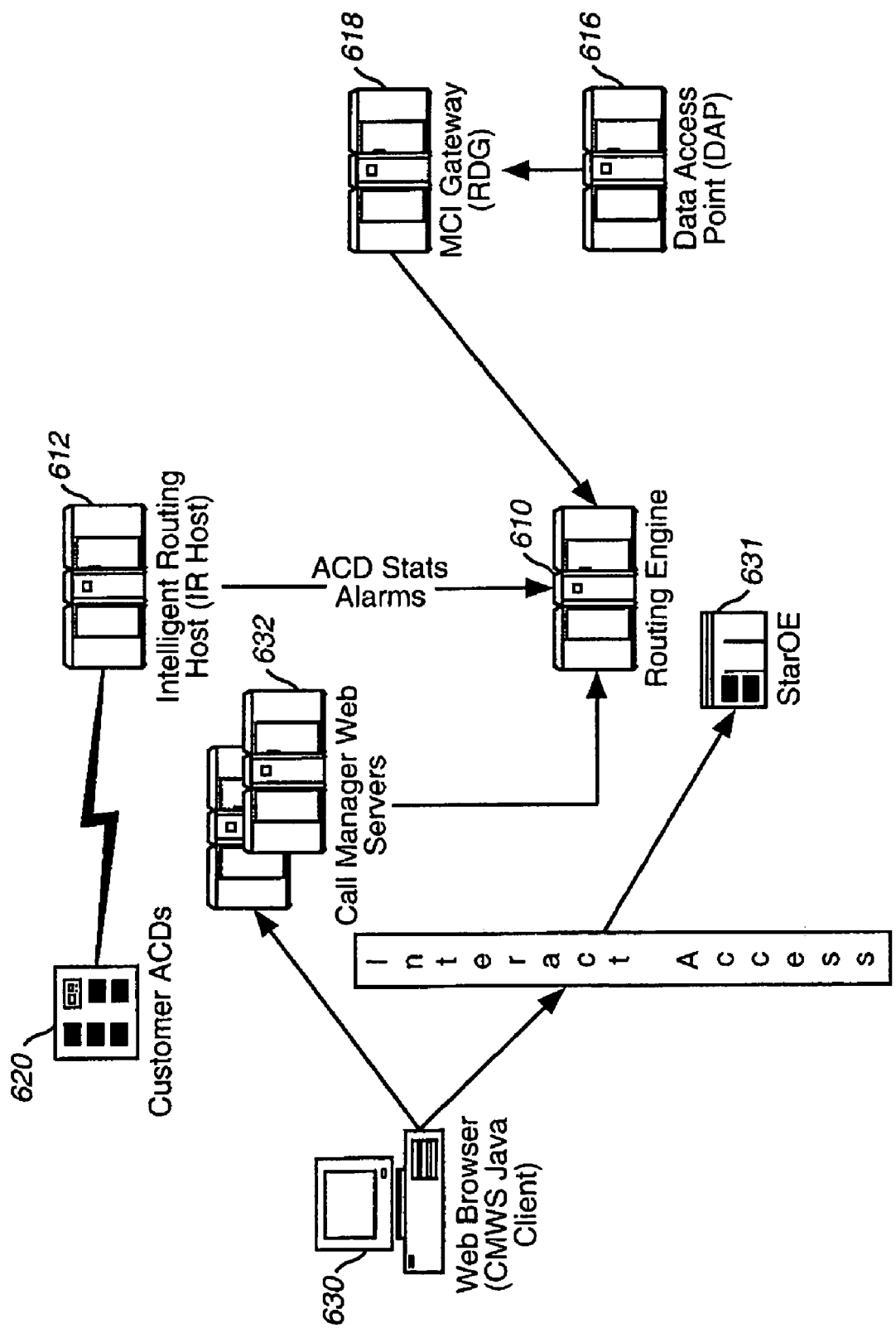
FIG. 5 illustrates an example of call manager webstation application physical architecture when one or more call manager web servers 632 bypass the CMIDS component of the present invention.

In the embodiment shown in FIG. 8, the web server 632 includes a proxy server 670 and a database 672, e.g., Informix database. In this embodiment, the web server 632 includes the capability to communicate directly to the routing engine, e.g., SCP, bypassing the CMIDS 640, by having the proxy server reside physically in the web server. FIG. 5 illustrates an example of call manager webstation application physical architecture when one or more call manager web servers 632 bypass the CMIDS component of the present invention. As shown, the call manager web servers 632 directly communicate the messages, i.e., translated client requests, to the SCP 610. In addition, in this embodiment, it is the SCP 610 which receives ACD statistics, alarms and other information from the IR host 612, and communicates the information to the web servers 632. As described previously, the SCP 610 serves as the routing engine through which customers provision routing rules and associated tables or list, view alarms, route peg counts, etc. It houses the applications used by customers to manipulate the features of their automated call distributor (ACD) FIG. 5 also shows the call manager web client 630 as being authenticated via the networkMCI Interact platform and its StarOE authentication and entitlement system 631. Briefly, customers who have subscribed to the call manager through the networkMCI Interact suite may access the application via the networkMCI Interact home page. The customer is typically prompted for a name and password entry. The networkMCI Interact platform validates the password and authenticates with the StarOE system 631, verifying that a customer's profile allows access to the call manager webstation application. Upon valid authentication, the call manager webstation application session may begin with the client webstation communicating with the call manager web servers 632 for providing the various functionalities.

In another embodiment, as will be described below with reference to the CMIDS 640 illustrated in FIG. 10, the data processing components for business and data logic, i.e., the proxy server and the database resides with the CMIDS 640, thereby reducing the functions of the web server 632 to an application server providing primarily state and session management. Porting the proxy server 670 over to the CMIDS 640 may be easily performed. The transaction handler in the middle tier, i.e., the message manager 656 still passes messages between the Web client 630 and the CMIDS 640. The only change needed is that the transaction handler connects to the proxy residing on the CMIDS 640, as oppposed to the proxy 670 on the web server 632.

The proxy server 670 generally processes message transactions from the client 630 and is multithreaded to handle multiple message transactions simultaneously. The proxy server 670 is designed to process one type of message transaction or a set of message transactions. In this embodiment, routing of the messages to and from the proxy is handled by the message manager 656. The proxy server 670 also interacts with a database 672, e.g., Informix, to pass back information to be displayed by the client 630. The proxy server opens a connection to the SCP 610 to retrieve information about routing plans or report statistics by sending the SCP "man machine language" protocol (MML) commands. Upon retrieval, the proxy server 670 formats a response message which is sent back to the client webstation 630 so that it is displayed on the current web page. As the message reply is sent back to the client 630, each thread created by the proxy server 670 is completed. It should be noted that the proxy server 670 need not reside in the web servers 632. Instead, as will be described with reference to FIG. 10, the proxy server 670 may reside in the CMIDS 640, the back-end server component.

The database 672 generally maintains information needed to translate the messages to and from the SCP 610. A message translation program written in 4GL accesses the database 672 when a message transaction is received. The program translates the message and sends the message to the SCP 610 for processing. After the message has been processed, the program translates the response and sends it back to the message manager 656. The proxy server 670 typically invokes an instance of the translation program for each message transaction it receives and processes. As noted above with reference to the proxy server, the database 672 may also alternately reside in the CMIDS with the proxy server.

In a first preferred embodiment, the present invention includes a data server, i.e., the CMIDS. In this embodiment, much of the functions of the proxy server are performed within the data server. More specifically, the proxy server 670 and the database 672 may be ported over to the CMIDS 640. The web server 672 communicates to the proxy in the CMIDS 640 which then communicates with the routing engine, e.g., SCP (FIGS. 6, 7 at 610). The call manager integrated data server (CMIDS) 640 generally services web requests for the webstation application and serves as a front-end for the routing engine, e.g., SCP (FIGS. 6, 7 at 610). Referring back to FIG. 7, the CMIDS 640, in addition, provides data storage and management for data resident on the SCP 610, the IR host 612, and/or other servers. The CMIDS 640 also provides pass through connectivity for rules writing and other provisioning from the client webstation 630 to the routing engine, e.g., SCP 610. The CMIDS includes databases 642a–c and provides an interface to the call manager SCP 610 for rules writing and list management. The CMIDS databases 642a–c are extracted or replicated from the routing engine, e.g., SCP 610, and/or the IR host 612. In an example shown, the SCP 610 services are requested and satisfied through a protocol known as "man machine language" (MML) commands. The CMIDS 640 utilizes MML as well as other interface mechanisms supported by the SCP 610. The call manager integrated data server (CMIDS) 640 physically resides on hardware located behind the intranet firewall 662 as shown.

The proxy server 670 and the database 672 which were described with reference to the web server 632, may reside in the CMIDS 640. In addition, the CMIDS 640 may also include a session manager 658 and associated session table 660 for managing the client sessions. As described above, the proxy server 670 generally handles webstation client 630 requests passed from the web servers 632 by accepting message transactions from the webstation client 630 via the web servers 632, maintains logging information, sends the request to a session manager 658, and receives data from the back-end and forwards data to the web servers 632.

The session manager 658, residing in the CMIDS 640, receives data from the proxy server 670. The session manager 658 updates the sessions table 660, validates that the user has proper privilege to perform the task. The user validation function may be performed for the webstation client 630 also, in addition to a validation conducted by the networkMCI Interact StarOE authentication and entitlement system during the session log on.

The CMIDS 640 also may include a routing engine formatter, a CMIDS transaction manager, and a routing engine port manager. The session manager 658 typically passes a transaction request received from the web server 632 to either the routing engine host formatter, or the CMID transaction manager. The routing engine host formatter module services transactions requiring SCP services to fulfill the request. The transactions originating from a webstation client 630, are translated to a correct MML format and sent to the routing engine port manager component.

The CMIDS transaction manager module services transactions that do not require the routing engine, e.g., SCP 610, i.e., the types of client request which may be serviced locally on CMIDS, including: obtaining NEMS alarm information, obtaining GDD information, and processing of user security. When the local processing is complete, results are sent back to the proxy server 670 component.

The routing engine port manager component of the CMIDS manages pools of session with one or more routing engines, e.g., SCPs 610. The routing engine port manager logs onto each session in a pool using a "generic" user id. Using a "generic" user id enables each session to access an individual user's data without having to log each user onto the SCP 610. MML commands for a particular user are sent to a SCP using any available session in the pool of "generic" session. After an MML command is sent and a response is received, the session is returned to the session pool and freed for use by the succeeding transactions. A session pool is defined as a set of sessions connected to one particular SCP 610. Therefore, the routing engine port manager component of CMIDS 640 supports multiple session pools for communicating with multiple SCPs 610.

The routing engine port manager also maintains the state of each session in each pool. The port manager generates a keep-alive-message whenever a session is idle to keep the SCP 610 connection from being dropped. If a session in a pool has failed, the routing engine port manager will try to reestablish the session and add it back into the pool when establishment is completed. The routing engine port manager determines the communication channel to use to access the SCP 610 and keeps a number of connections open to the SCP 610. Each message is sent to the SCP 610 and the channel blocked until a response is received.

Figure 10:
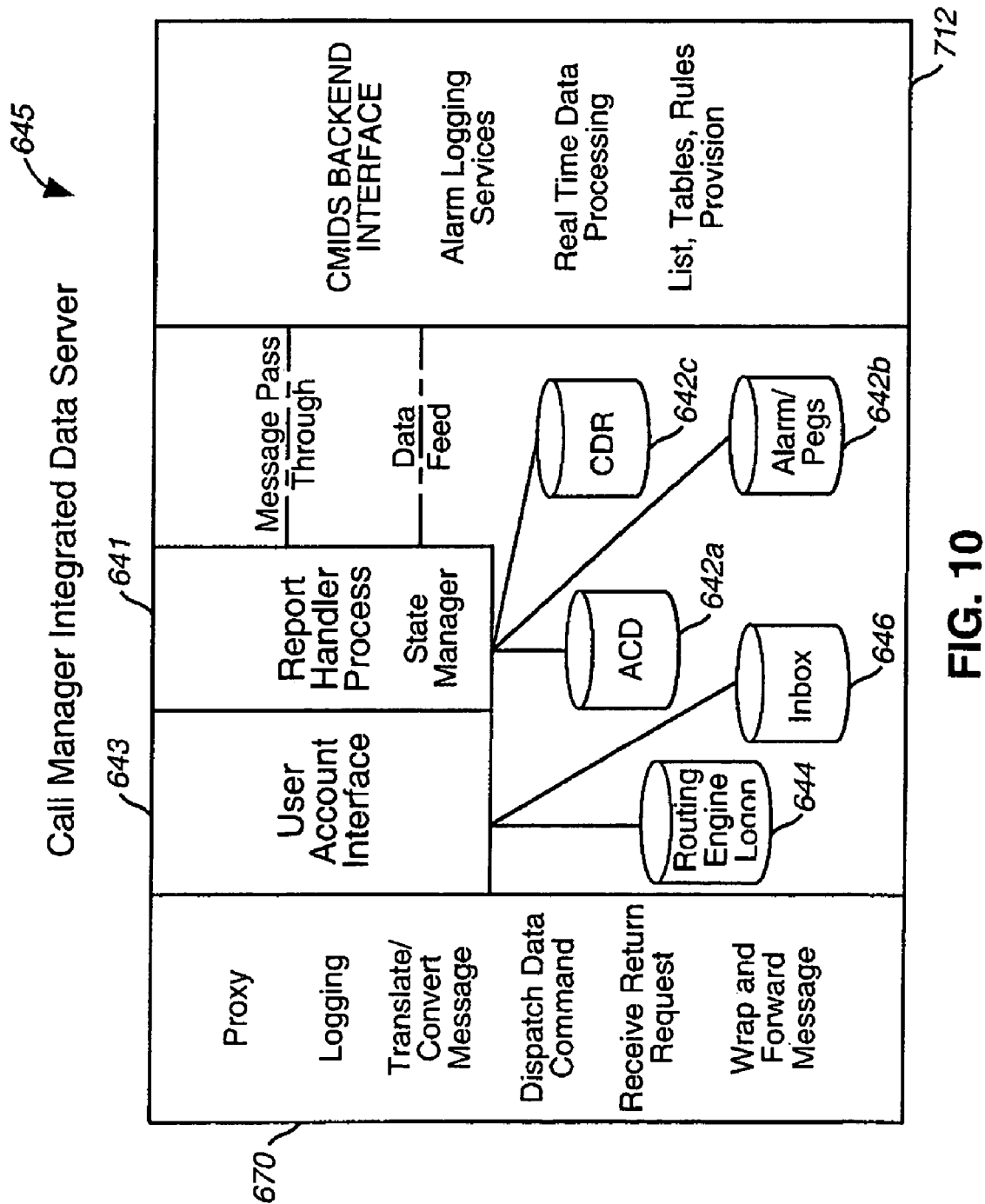
FIG. 10 is an example of a CMIDS conceptual model 645 providing details of the CMIDS software components.

FIG. 10 illustrates an example of a CMIDS conceptual model 645 providing details of the CMIDS software components. The CMIDS software architecture includes proxy 670, system administration, and inbox 648 components offering functions analogous to the networkMCI Interact equivalents, but applicable to the call manager webstation (CMWS) application specifically.

The proxy 670 software component was described above with reference to FIG. 8. As shown, the proxy 670 may reside in the CMIDS, and provide the functionalities described above. The user account interface software component 643 generally maintains sessions with the SCPs and provides the functions of the routing engine port manager described above. The report handler process generally maintains databases 642a–c and provides reporting facilities. The CMIDS back-end interface 712 supports a number of interface mechanisms including MML and command line access to the SCP, common alarm and logging services, and data retrieval from the IR host.

Figure 11:
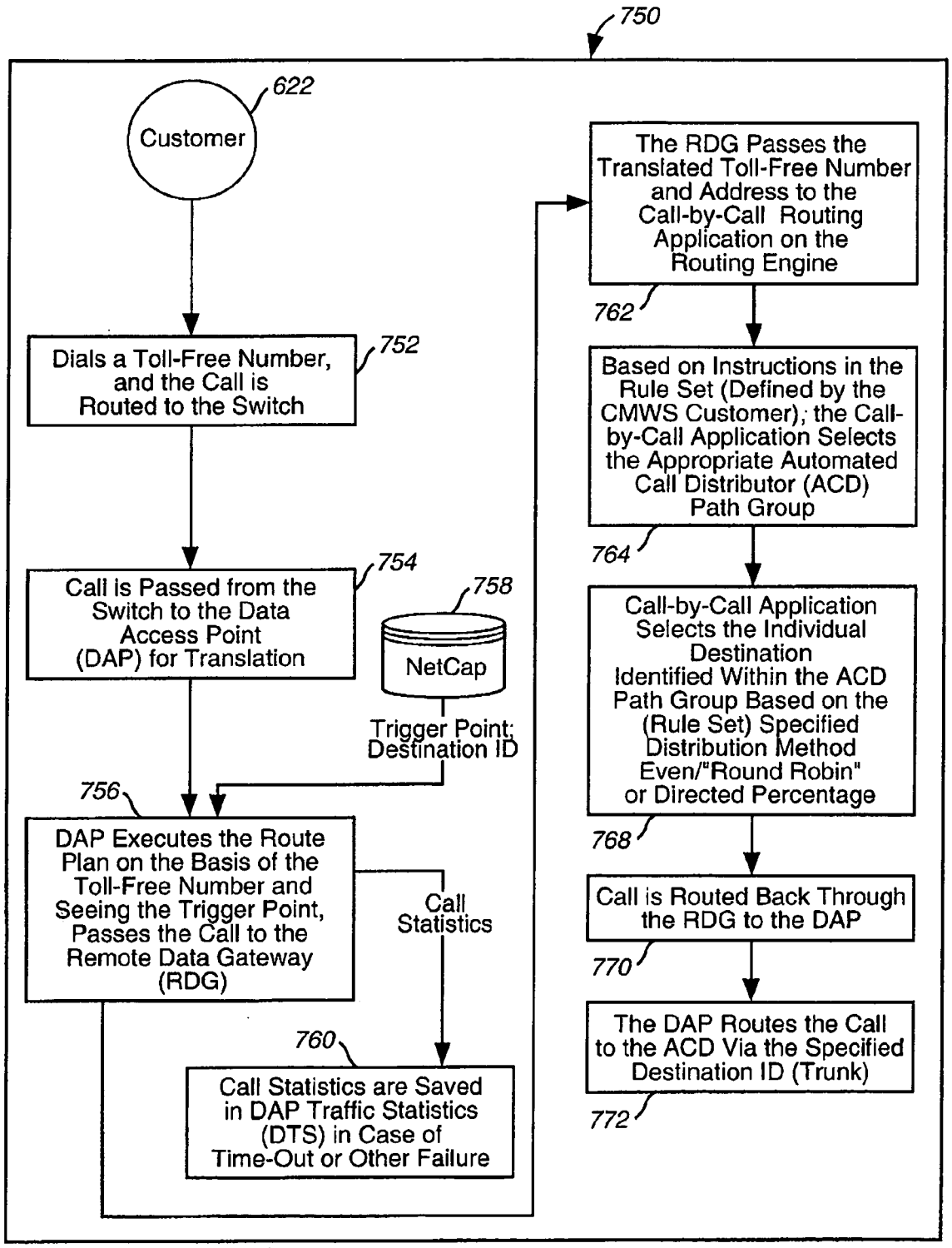
FIG. 11 illustrates a back-end process flow for the system of the present invention.

FIG. 11 illustrates a back-end process flow for the system of the present invention. A customer 622 typically dials a toll-free number. As an illustrative example, this toll-free number may be provided by a company having operators taking telephone orders. In addition, the company provides three trunk lines or destination identifiers going into its ACD. The company services a call centered media-based sales application, e.g., home shopping network, through this ACD which includes a toll-free number for customers to call. To handle calls to the home shopping network client, the company sets up an ACD path group called "HSN." This ACD path group includes the three trunk lines as member destinations and reports agent and call statistics from the total number of agents servicing home shopping network, regardless of the particular trunk lines.

Accordingly, as shown at step 752, when the customer 622 dials the toll-free number, the call goes to the network through the switch. At step 754, the call is passed from the switch to the DAP for translation. The DAP translates the toll-free number to a network number and maps it to an address readable by the RDG. NetCap 758 generally houses routing plans, destination labels, toll-free numbers, logical terminations, DAP-based details and trigger plans required for the call manager webstation system. Most of this data may be provisioned in NetCap 758 via the Toll Free Network Manager (TFNM) application service. The TFNM is described in detail in U.S. Pat. No. 6,115,040, contents and disclosure of which are incorporated by reference as if fully set forth herein. Seeing the trigger point and other DAP-based data provisioned from NetCap 758, the DAP passes the call to the RDG at step 756. At step 760, call statistics are saved in DAP traffic statistics (DTS) for use in case of time-out or other failures. They are also stored within the IR host. At step 762, the RDG, with its ability to communicate with the SCP, passes the network number and associated address to the call-by-call routing application on the SCP. Based on instructions in the rule set defined by the call manager webstation system customer, the call by call application selects the HSN ACD path group at step 764. At step 768, call by call application then selects the individual destination identifier within the ACD path based on the specified distribution method which may be either even/"round robin" or directed/percentage distribution. At step 770, the call is routed back through the RDG to the DAP. Then at step 772, the DAP routes the call to the ACD via the specified destination id or trunk. Specifically, referring back to the above illustrated example, calls received on Thursdays between 5:00 and 7:00 GMT may be set to be routed to Orlando, and accordingly the destination id is Orlando Central. The call by call routing application returns destination id "Orlando Central" to the network, which routes the call to the ACD via the Orlando Central destination id or trunk.

Call Manager Client GUI Application Implementation

As described previously, the call manager client software uses the networkMCI Interact common objects (CO). Generally, the CO includes a library of objects that minimizes the replication of code, and provides a framework in which a family of Internet applications may be managed and created. This framework includes communications, I/O services to local resources, user authentication, internationalization, common look and feel, application management, and a model view controller (MVC) framework. The call manager client classes typically derive from the CO classes.

The application backplane architecture supports the plugging in of applications into one Java applet, which allows for one application's classes to use another's services. Accordingly, a COBackPlane class is derived from the Java applet class, and the networkMCI Interact backplane logic is implemented as an instance of the COBackPlane class. A class COApp acts like a Java applet, but does not derive from the Java Applet class. The COApps may be started and stopped from the class COBackPlane.

Each COApp frame is derived from a COAppframe, which has one or more CoViews, a part of the standard MVC paradigm. The MVC paradigm allows for easy handling of multiple views of a data model. The model is a wrapper for an application data object. A controller is a lightweight event handling class, which translates GUI events into commands for the application. The view is one particular GUI representation of the model. In a MVC typical operation, views register with a model, allowing the updating of multiple views when the model changes. Each view has a controller, which handles the GUI events, and translates them into command descriptions. The model stores command descriptions, which for example, enables the undo and redo functionality in the application.

The call manager client application (CMApp) is preferably derived from the COApp class and may be launched by a backplane object that is typically derived from the COBackPlane class, including the networkMCI Interact backplane.

In a first embodiment of the present invention, the call manager client application is launched in a separate browser window from the one within which the networkMCI Interact backplane is running. For example, after validating that a customer's profile allows access to the call manager application, and after a customer clicks the call manager icon on the networkMCI Interact home page (FIG. 4), the networkMCI Interact backplane creates a separate browser window and populates the call manager webstation URL. The call manager webstation web server then downloads the call manager client application for execution within the new browser window.

In a second embodiment, the call manager webstation application may be launched as a standalone, i.e., outside the networkMCI Interact home page. For example, a customer may retrieve the web page the call manager webstation application directly from the client's web browser by pointing to the call manager webstation URL. The call manager webstation web server then downloads the call manager client application for execution, in a similar manner as the first embodiment described above.

The call manager client application downloaded from the server includes a CMBackPlane class which is applet derived from the COBackPlane class and which inherits the attributes of the COBackPlane class. The CMBackPlane is launched with the call manager webstation web page and provides backplane functionalities within the context of the call manager webstation application. The call manager client application also includes a aFeature class from which the CMFeature is derived. The CMFeature typically is invoked by the CMApp and provides an application specific functionality within the call manager application such as reporting, alarm management (NEM), graphical data display (GDD), and call by call application.

The browser typically starts the call routing management applet which launches a CMApp by calling its init method. The CMApp sets and displays a main toolbar which may be implemented using a view of a model in a MVC paradigm described above. When a user presses a button on the main toolbar to launch a feature, e.g., NEMS, Rules, etc., the CMAppView derived from the theMainToolbar class creates/activates the selected feature and initializes it. When the CMFeature is instantiated or started, it invokes a method to create a frame, the CMFeatureFrame, in which to run the selected feature.

Call Manager Webstation Application Features

Figure 12:
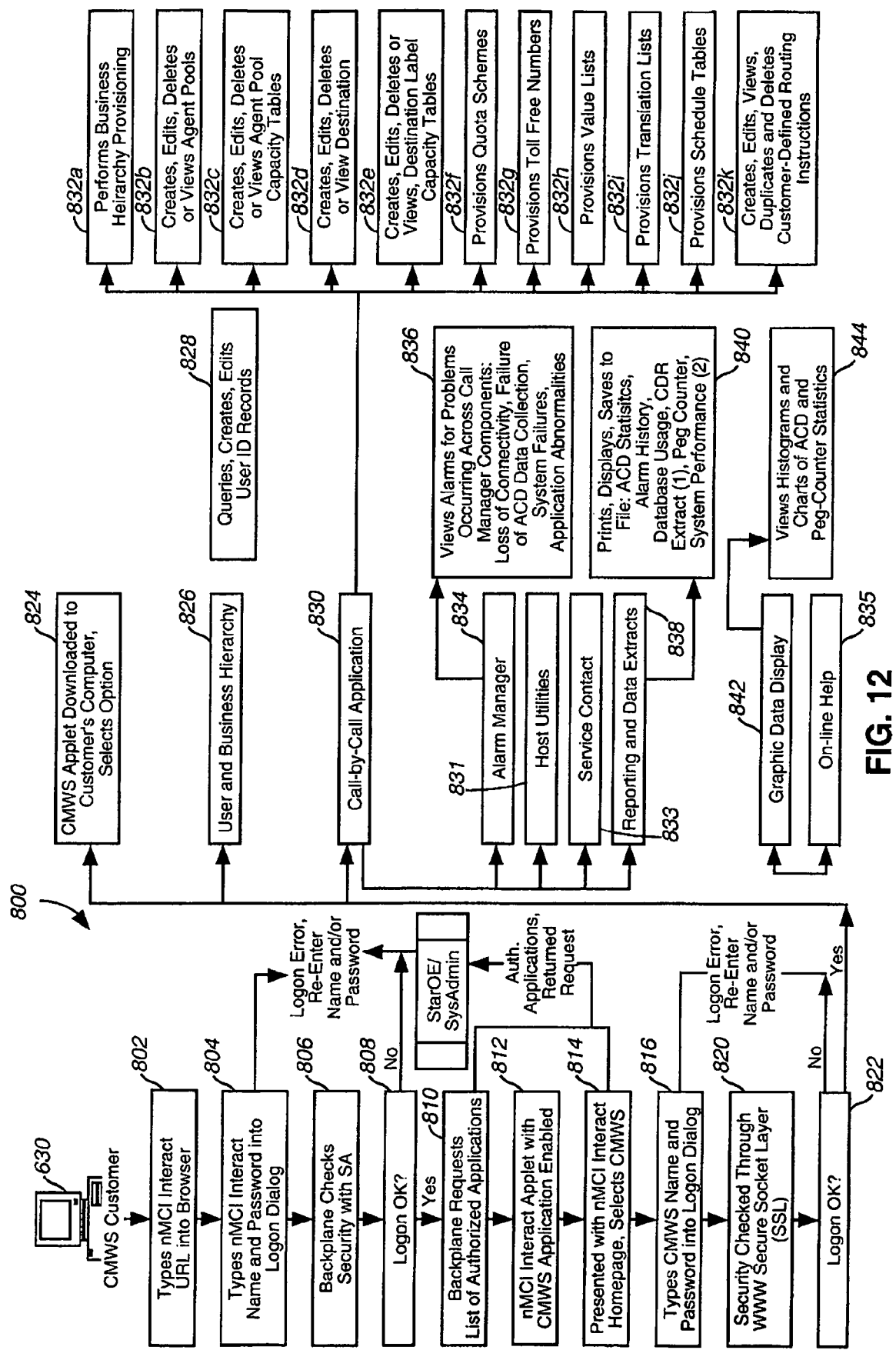
FIG. 12 illustrates an application-level process flow 800 for the system of the present invention.

As described above, the call manager webstation application allows authorized customers to manage their ACD data networks via a web-based interface. Specifically, customers are enabled to provision hierarchies for their business; control all routing of their toll-free traffic; create, modify or delete agent pools; manipulate capacity tables; and define quota schemes, value lists and schedule tables. FIG. 12 illustrates an application-level process flow 800 for the system of the present invention. A customer at a client webstation 630 having Internet connectivity and a web browser, for example, the Internet Explorer® 4.01, accesses the call manager webstation application by pointing the browser to the networkMCI Interact URL as shown at step 802. At step 804, the customer is then presented with a networkMCI Interact log on screen where the customer types in a name and password pair. At step 806, the log on applet associated with the log on page typically checks the entered name and password. At step 808, if the log on name and password is determined to be invalid, the customer is prompted to reenter the log on transaction at step 804. If the log on transaction is valid, the customer is presented with the networkMCI Interact home page (FIG. 4) downloaded from the web server. With downloading and presenting of the home page, the web browser at the webstation 630, deploys a backplane applet via which the call manager client GUI application may be invoked.

As described in reference to FIGS. 3 and 4, the application backplane is a Java® applet invoked inside the networkMCI Interact's home page and is the conduit through which all other client applications may be deployed, including the call manager webstation GUI client application. At step 810, the backplane requests a list of authorized applications from the StarOE authentication and entitlement system for the networkMCI Interact platform. The StarOE is described in detail in U.S. Pat. No. 6,587,836, contents and disclosure of which are incorporated by reference as if fully set forth herein. At step 812, a select list of applications which may include the call manager webstation application of the present invention, is enabled on the home page according to the customer specific entitlements, as received from the StarOE. The call manager webstation application may then typically be accessed from the home page (FIG. 4) with an icon labeled "call manager" 252*f* (FIG. 4) as shown at step 814. Accordingly, a call manager webstation session begins when a customer clicks on the call manager icon, triggering the backplane to launch the call manager webstation client GUI application.

At step 816, the customer is then presented with a call manager webstation application log on dialog, on which the customer enters the call manager webstation log on name and password. In addition, the customer may be presented with a change password dialog. This dialog implements a password expiration design feature supported by the present invention. Generally, for security reasons, a password is valid for a predetermined period of time. After that period, the customer must change to a new password.

In addition, multiple engines may be handled through the web client front-end and translation processing at the back-end. The front-end client application sends a command to retrieve a list of SCP names. The host information is stored at the back-end with the Informix database and, typically an SQL routine retrieves the available SCP. The proxy residing at the back-end returns a list of the available SCP to the front-end web GUI client application. The proxy generally maintains a "routing engine" list having SCP names and their IP addresses. Maintaining the list of routing engine names on the proxy allows for easy modification of routing engine names and IP addresses with no impact to the client code.

When the front-end web GUI client application receives the list, a list of routing engine names may be displayed in a drop-down list for the customer to select, or the customer may be prompted for the SCP desired. The selected routing engine name is sent along with a log in transaction having user name/password to the back-end, when the customer clicks a "log in" button from the log in dialog. The "establish-session" command is then sent to the back-end where the proxy may open a connection to that routing engine. The proxy maps the SCP name to the appropriate IP address and forwards the user log in request to the routing engine. The SCP id selected at log in is populated in the toolbar at the client webstation.

Referring back to FIG. 12, at step 820, the entered log in name is validated typically by the call manager webstation web server or the proxy as described with reference to their functionalities above. At step 822, if the log on is valid, the call manager webstation applet is downloaded to the customer webstation 630, and at step 824, the customer is presented with the screen 870 shown in FIG. 13 through which the customer may perform the call manager features of the present invention provided. These features include: manipulating user and business hierarchy by querying, creating, or editing user id records as shown at steps 826 and 828; managing routing schemes via the call by call application as shown at steps 830 and 832*a–k;* invoking alarm manager at step 834 and 836 to view problems occurring across the call manager components, such as loss of connectivity, failure of ACD data collection, system failures, and application abnormalities; reporting and data extracts at steps 838, 840 for printing, displaying and managing ACD statistics, alarm history, database usage, peg counter, and system performance; graphic data display at steps 842, 844 for viewing histograms and charts of ACD and peg-count statistics; managing host utilities at step 831; requesting service at step 833; and retrieving on-line help at step 835.

More specifically, by selecting the option at step 826, to manage a user and business hierarchy, via, e.g., the security button 882 (FIG. 13) from the toolbar 880 (FIG. 13), a customer may search for a user id and, with appropriate privileges, create or edit a user id for a business level below their own. Through this option the customer may also access reporting visibility to all data items belonging to the customer and any business level below their own. In addition, the customer may assign a read, read/write, or no access privileges to each function in the user id profile. More over, the customers may administer and modify limits on the number of entities that a business unit may own in the provisioning database.

By selecting the call by call application at step 830, for example, by clicking on an icon labeled "Provisioning" (FIG. 13 at 874) on the call manager web station tool bar displayed on the screen 870 in FIG. 13, the customer may perform business hierarchy provisioning as shown at step 832*a*. The customer may select the option at step 832*b* and perform load-balancing by determining the degree of "busyness" by tracking the average call handling time, the number of agents, and the number of calls routed to each destination. At steps 832*c* and 832*e*, the customer is enabled to provision capacity tables for providing a default staffing allocation for use by the load balancing algorithm. With the call by call option as shown at step 832*d*, the customer may also provision basic destination ids representing a single call termination on the network which may be a single telephone instrument or a line termination into a PBX. Destination ids with ACD feeds, which may represent a single call termination into an ACD, may also be provisioned. Provisioning of ACD path groups representing a set of destination ids that terminate on the same physical ACD and share the same statistical data feed is also enabled. Provisioning of Destination Groups representing a set of logically related destination ids and/or ACD path groups is possible via the call by call option. Destination Groups are a convenience mechanism for writing rules that refer to multiple destinations without having to list each destination separately. In addition, the customer may provision distribution methods, e.g., an even distribution method, which is a round-robin selection of destination ids, or a directed distribution method, in which the calls are routed to destination ids based on a percentage allotted to each destination id.

At step 832*f*, customers may specify and maintain call routing quotas for destinations. At step 832*g*, the customer is enabled to provision called numbers. For example, the customer creates a rule set associated with the called number. The rule set typically determines the location of the caller and selects the appropriate destination number for the nearest warehouse. At step 832*h*, the customer may provision value lists which are sets of related numeric values. They are typically used in rule sets to test the attributes of an incoming call to determine a characteristic of the call or caller. An attribute of the call (such as the ANI) is tested against a value list. If the value of the call attribute matches an entry in the value list, then other rules are executed based on this logical condition. This feature is highly useful for non-English-speaking callers. At step 832*i*, the customer may provision translation tables. The translation tables include a highly flexible mechanism for performing a table lookup and returning a value that corresponds with the search argument. At steps 832*j* and 832*k*, the customers may maintain user variables such as setting up names for peg counters and rule variables and routing instructions.

By selecting the alarm manager option at step 834, for example, by clicking on an icon labeled "NEMS" (FIG. 13 at 872) on the call manager web station tool bar displayed on the screen 870 in FIG. 13, the customer may display various alarms for problems occurring across the call manager components. These components were described above. Typically, alarming is performed through the BMC patrol software agents with monitoring provided by the system operational support (SOS) organization, which monitors other components of the call manager platform. Patrol's "logwatch.config" allows setting up a file name and a selection string. Patrol agents typically monitor the file and pass alarms matching the selection string to the web clients. For logging application level alarms, a UNIX syslog facility is used. A set of "send-alarm functions" interfaced between the application processes and syslog daemon is added to a common utility library. Through the send-alarm function the call manager application processes send the alarm messages to the same log file with different levels of severity. The alarms with high level of severity is generally monitored by system operational support (SOS) organization through BMC patrol software. Each alarm message typically includes a process name, an alarm number, and a severity level. A typical alarm message looks like: "Apr 8 17:23:31 cmjwstest Process Name [Process PID]: [LOG_Alert Number] can't set up a connection to XXX Nexus at Line 65 File proxy." The alert number then may be used to determine possible solutions.

Referring back to FIG. 12, selecting the reporting and data extracts option at step 838, for example, by clicking on an icon labeled "Reporting" (FIG. 13 at 876) on the call manager web station tool bar displayed on the screen 870 in FIG. 13, enables the customer to obtain reports of ACD statistics, alarm history, database usage, CDR extracts, Peg counters, and system performance. Each of these reports may be generated on-line or by a print function within the application. The ACD statistics are monitored in live, near-real-time by the SCP application. A load-balancing algorithm uses ACD statistics to determine the "busy-ness" of a destination. When an ACD Path Group is selected as the least busy location by the load-balancing algorithm, one of the individual destination ids within that ACD path group is picked to carry the call. The reports of alarm history permit the customer to view the status of alarms and events on the various hosts. An alarm or event may be an informational message sent autonomously from a host. Database usage reports generally provide information on users, typically by user id, accessing a workstation, SCP, or call by call application. The CDR extracts generally provide a database record of call detail record information about a called number translation query and its outcome of the routing translation process. Peg counters generally represent a series of accumulators that are available to the user for counting actions or situations encountered in a rule set. System performance reports allow the customer at a workstation (webstation) to monitor capacity of the host and application components to foresee and prevent possible outages.

Additional ACD statistical data which may be viewed and monitored via the tool bar (FIG. 13 at 880) include: (1) the number of calls abandoned during a reporting interval; (2) the number of calls answered during a reporting interval; (3) the number of calls completed during a reporting interval; (4) the number of agents currently available to take calls; (5) the number of agents currently handling active calls; (6) the number of agents currently performing follow-up or after-call activities; (7) the number of agents logged in to the ACD but who are not available to handle calls due to an auxiliary work; (8) the total number of agents available including those handling active calls and/or performing follow-up work related to a call; (9) the total number of agents currently logged in to the ACD including those agents in auxiliary work state; (10) the number of calls currently in queue waiting for an available agent; (11) the percentage of calls abandoned during a reporting interval; (12) the number of seconds the oldest call in queue has been waiting; (13) the average time to handle a call including talk time and after-call work time; (14) the average time the calls wait in queue for the available agents; (15) the average time in queue for the calls which were abandoned; and (16) a total demand time denoting a ratio of a number of calls to a number of agents working on calls.

Selecting the graphic data display option at step 842, for example, by clicking on an icon labeled "GDD" (FIG. 13 at 878) on the call manager web station tool bar displayed on the screen 870 in FIG. 13, enables the customer to obtain and view histogram, chart, and line graph displays of ACD-based statistics and routing peg counts, which may be refreshed as frequently as once per minute.

Selecting the service contact option at step 833, for example, by clicking on an icon labeled "Cust Service" (FIG. 13 at 879) enables the customer to contact and/or request services relating the telecommunications routing management. Similarly, selecting the service on-line help option at step 833, e.g., by clicking on the icon labeled "Help" (FIG. 13 at 875), enables the customer to retrieve the on-line help.

Rules Writing, Testing, Debugging Application Features

The rules feature (FIG. 13 at 884) allows users to write rules for routing of toll free calls. Rules may load balance based on call center capacity and route based on automatic number identification (ANI), caller entered digits (CED), or quotas. Via this feature, users may also test, install, uninstall, and swap rules as shown at FIG. 13. The bottom half of screen 870 in FIG. 13 displays a typical rules writing/editing template. The users may build rules on the rules construction area 882 by including statements selected from the constructs list box and the statements list box 884. The users may also select various options 886 available for the selected construct or statement for building the rule.

For enabling a rule writer to test a rule set, the rules feature provides a rules debugger/tester functionality which runs a rule set against a set of test data, i.e., call context, simulating call scenarios in which to test a rule set logic. This optional facility allows rule writers to check if their rule set exhibits the expected behavior, for example, before installing the rule set on the network. Moreover, because this test feature is purely optional, a rule writer need not run the rule testing functionality before the rule is installed.

When a customer, e.g., a rule writer, selects the debugger/tester feature option, a rules testing dialog appears. Via this dialog, a user may define a call context parameters for simulating call scenarios in which to test a rule set logic. The basic call context includes called-number, ANI, CED, carrier, date and time of the call. Optionally, the user may also modify the different parameters of destinations and quotas that may affect the load balancing.

In addition, an option to allow the database to be updated during the simulation is also provided. During the testing process, the customer may step through the simulation one line at a time or choose a "Run" command to run through the entire call all at once. Furthermore, during the simulation, the customer may select from various view tabs to view, including, a log view, a destination status view, a destination details view, a CDR view and a user variable view.

For executing the testing process, the debugger/tester uses the MML interface to the routing engine, i.e., the debugger/tester formulates the user actions to one or more MML commands and sends the translated command to the SCP. The SCP typically stores the state of testing (including the different views of the log), and manages the test execution.

System Status Display

Figure 14:
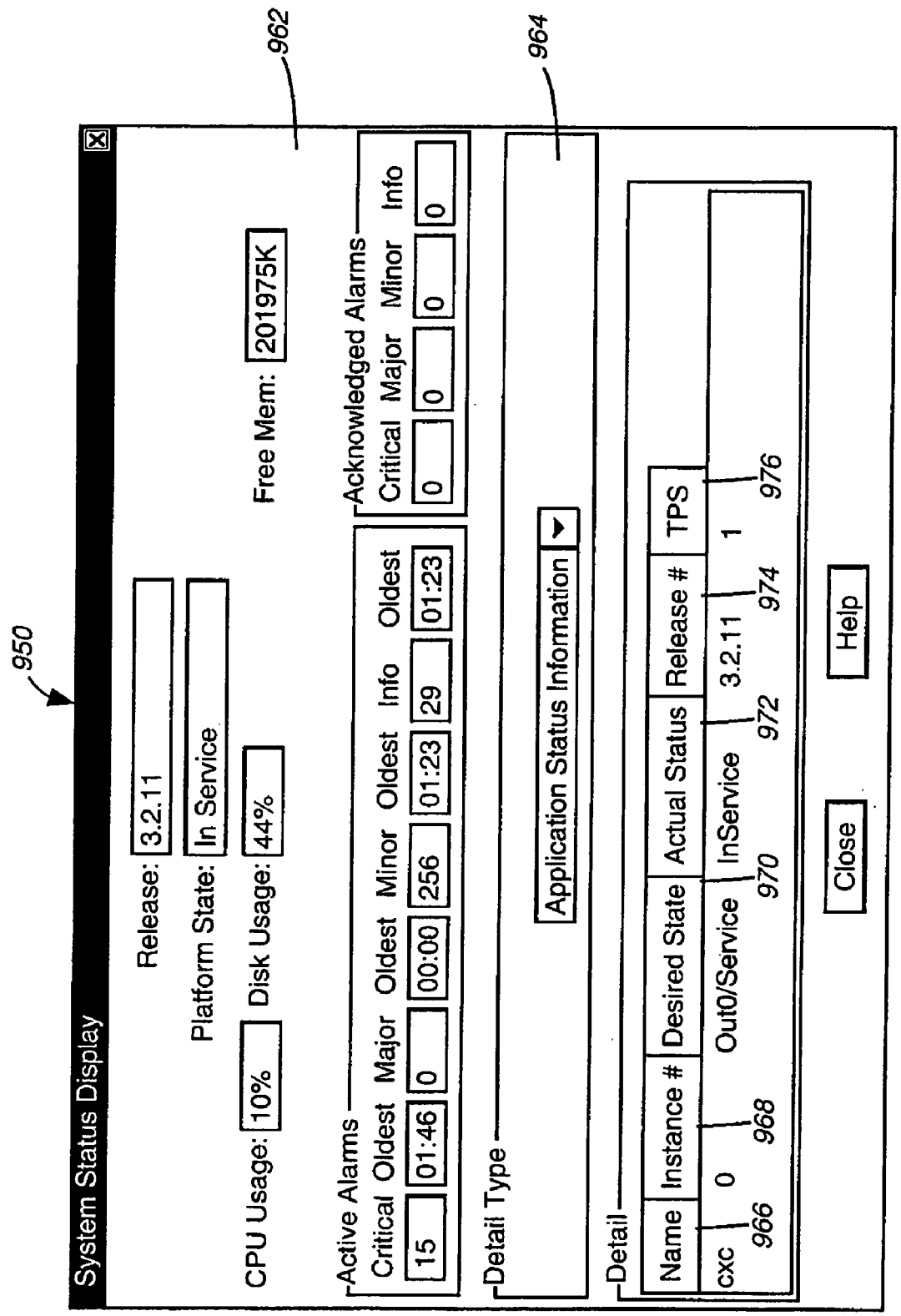
FIG. 14 shows an example of a system status display.

Typically, a system status display 960 shown in FIG. 14, is opened by selecting "Host Utilities" from the security (FIG. 13 at 877) button on the main toolbar. The dialog is non-modal. The top half of the dialog 962 includes general information about the system. The bottom half includes a combination box 964 that allows the user to select between the different options described above, i.e., application status, ACD gateway status, partner links status, signaling network links status, and webstation session links status. Selecting an option displays a list including information relevant to that option. As shown at 964, selection of the application status displays information which include application names 966, instance numbers 968, desired states 970, actual states 972, release numbers 974 and TPS 976. Similarly, selecting the ACD gateway status option displays information including gateway names, gateway states, gateway link states, collector link states, and dates/times of last change. Selecting the partner links status option displays routing engine names, states, link states, sync states information. Likewise the signaling network links status option displays information which includes linkset names, link names, states, dates/times of last change, and adjacent point codes. Selecting the WebStation session links status option displays information such as workstation instance numbers, locations, states, user ids, and dates/times of last change.

When the dialog first opens, an "ACT-DSP" message is sent to let the routing engine know that the user is ready to start receiving system status messages. An example of an MML message sent includes:

server.StreamPair : SCP client:[ACT-DSP:::00010;]
server.StreamPair : SCP server:[SCP 98/01/08 12:26:06 M 00010 COMPLD;]

When the message is received at the routing engine, the routine engine sends system status messages on a regular interval. The length of the interval may vary anywhere from every second to every minute. An example of routing engine status messages include:

Server.StreamPair : SCP server:[SCP 98/01/08 12:26:07 A 1 REPT STAT sysstat 3.2.11,A,63,213179,58,0,0,0,0,0,0, 299,0,0,1,0,0;]
server.StreamPair : SCP server:[SCP 98/01/08 12:26:07 A 2 REPT STAT link
SNET,RDG,RDG,InActive,12/20/97,17\:32\:41,
SNET,RDG,RDG,InActive,12/20/97,17\:32\:41,
SNET,RDG,RDG,Active,01/08/98,12\:26\:02,
SNET,RDG,RDG,Active,01/08/98,12\:25\:58,
SNET,RDG,RDG,InActive,12/20/97,17\:32\:41,
SNET,RDG,RDG,InActive,12/20/97,17\:32\:41,
ACD,N/A,N/A,Active,12/29/97,14\:25\:30,IRHOST
LSE,LSE,LSE-None,Active,12/31/97,07\:34\:05,
WKS,,100\ ,Active,01/08/98,11\:29\:14,zenith
WKS,,101\ ,Active,01/08/98,11\:52\:52,egriffin
WKS,,102\ ,Active,01/07/98,14\:00\:23,njones
WKS,,103\ ,Active,01/08/98,12\:09\:31,sysadmin
WKS,,104\ ,Active,01/08/98,12\:21\:32,ramku
WKS,,105*,Active,01/08/98,12\:25\:53,kmurray;]
server.StreamPair : SCP server:[SCP 98/01/08 12:26:07 A 3 REPT STAT appl cxc,0,InService,InService,3.2.11,0;]
server.StreamPair : SCP server:[SCP 98/01/08 12:26:07 A 4 REPT STAT net mci_norn,A,-,PrimaryOOS;]

In order to limit the amount of message traffic having to be sent to and from the client, data for these messages may be included into one message, "get-sys-stat." Preferably, the SCP sends the get-sys-stat message every 5 seconds. Each get-sys-stat is typically preceded by an "ru-alive" message that forces the back-end to read the socket for the latest data. When the user chooses to close the dialog, the messages are stopped by sending a canc-dsp message. An example of a canc-dsp message is shown below.

server.StreamPair : SCP client:[CANC-DSP:::00012;]
server.StreamPair : SCP server:[SCP 98/01/08 12:26:10 M 00012 COMPLD;]

The system status display messages are automatically sent from the SCP, once the messages are turned on. The back-end typically stores this type of message received from the SCP until the client queries for it. System status messages are generally stored in the following tables:
  stat_appl for REPT STAT appl messages,
  stat_link for REPT STAT link messages,
  stat_net for REPT STAT net messages, and
  stat_sysstat for REPT STAT sysstat messages.

A unique set of data is stored for each user currently performing a system status display. Subsequent messages received from the SCP typically overwrite previous data. For example, if the backend receives two (2) REPT STAT net messages before the client queries for the first, the second overwrites the first.

The Host Administration Functions

A user may select to perform host administrations by selecting the appropriate icon from the main tool bar (FIG. 13 at 877). Then a pull-down menu is presented with options including: backup, ACD gateway administration, ACD collector administration, FMS gateway administration, and FMS collector administration.

For backing up server database to either a tape or a disk, a user may select a "Backup" option from the administration button menu and invoke the backup functionality. The client GUI application sends a "RTRV-BK-STATUS" message to check the status of the back-end. If a return message is not "INPROGESS", a dialog box is opened for enabling the user to select the backup medium, i.e., tape, or disk. When the user selects a tape or disk option and clicks the start button, a "START-BACKUP" message is sent to the back-end. Subsequently, "RTRV-BK-STATUS" messages are sent every 5 seconds to retrieve the current status of the backup processing. The timer continues to increment every second, and the progress bar is continuously updated until the return message "DONE" is received. On the other hand, if the "START-BACKUP" message fails, an appropriate error dialog id displayed.

In addition, once the backup progress starts, the close button's text changes to "Cancel." Clicking the close or the cancel button while a backup is in progress prompts the user to cancel that backup. If the user selects yes, a CANC-BACKUP message is sent. Clicking the close button when a backup is not in progress closes the dialog box.

Figure 15:
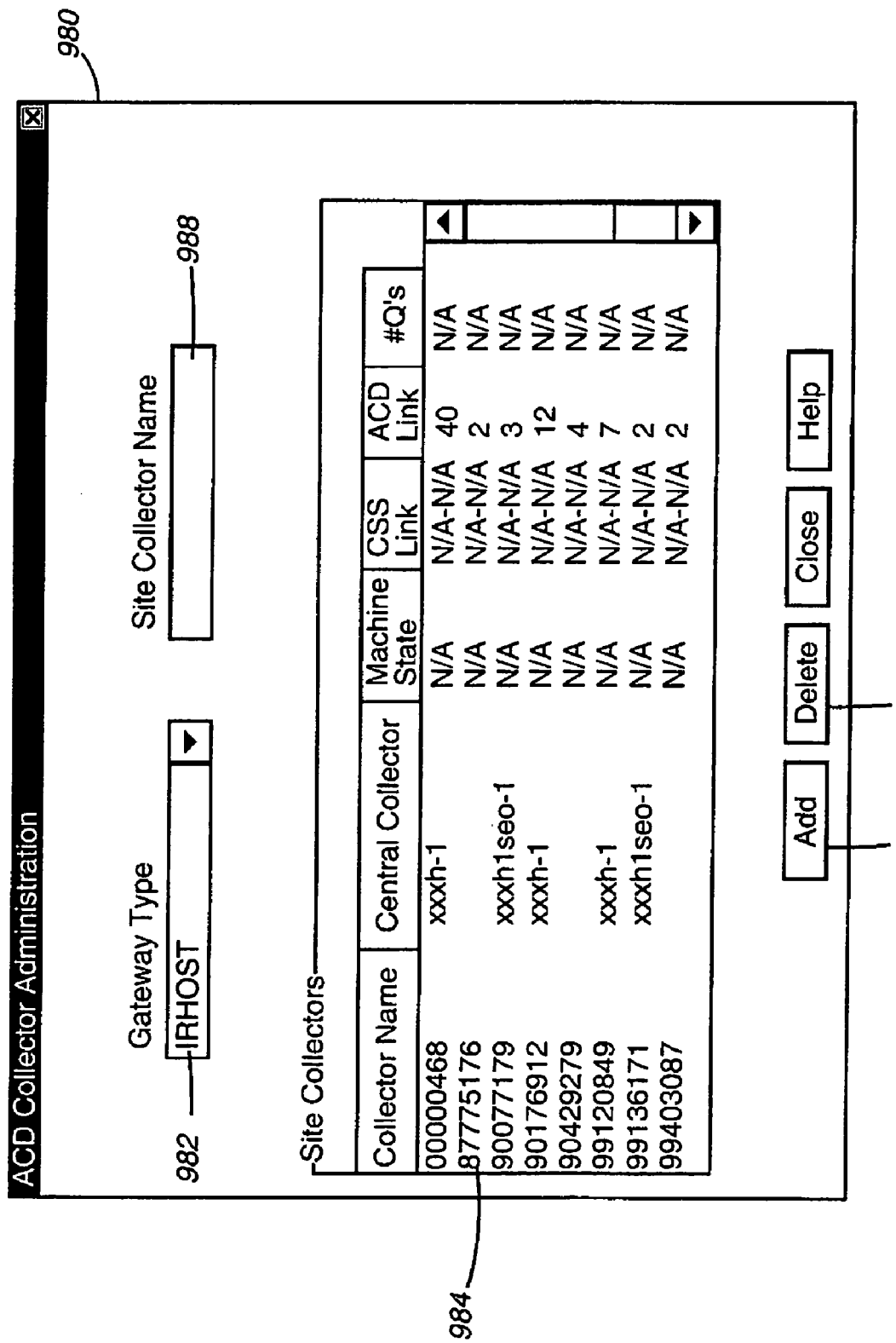
FIG. 15 illustrates an example of a ACD collector administration function screen displayed for providing the user with the ability to view, create, delete and edit ACD collectors.

The ACD gateway administration provides the users the ability to view, create, delete and edit ACD gateways. The ACD collector administration function provides the user with the ability to view, create, delete and edit ACD collectors. When this option is selected, a dialog 980 shown in FIG. 15 opens with a list of retrieved gateway types. Typically the client GUI application sends two messages to retrieve information needed to populate the dialog box 980. A "rtrv-acd-type" is used to fill the gateway type combo box 982. A "rtrv-acd-status" is sent to retrieve information 984 on the selected gateway type. Clicking a row in the list 984 enables the delete button 986. Typing characters into the site collector name 988 enables the Add button 990.

The FMS gateway administration and the FMS collector administration options provide the ability to view, create, delete and edit FMS gateways and collectors, respectively. The FMS administration dialogs share the same dialog box with the above described ACD gateway and collector administration functionalities. The same messages, i.e., the "rtrv-acd-type", and the "rtrv-acd-status", are sent to the back-end but with different parameter types, e.g., "FSM" or "ACD."

Company Branding

Figure 16:
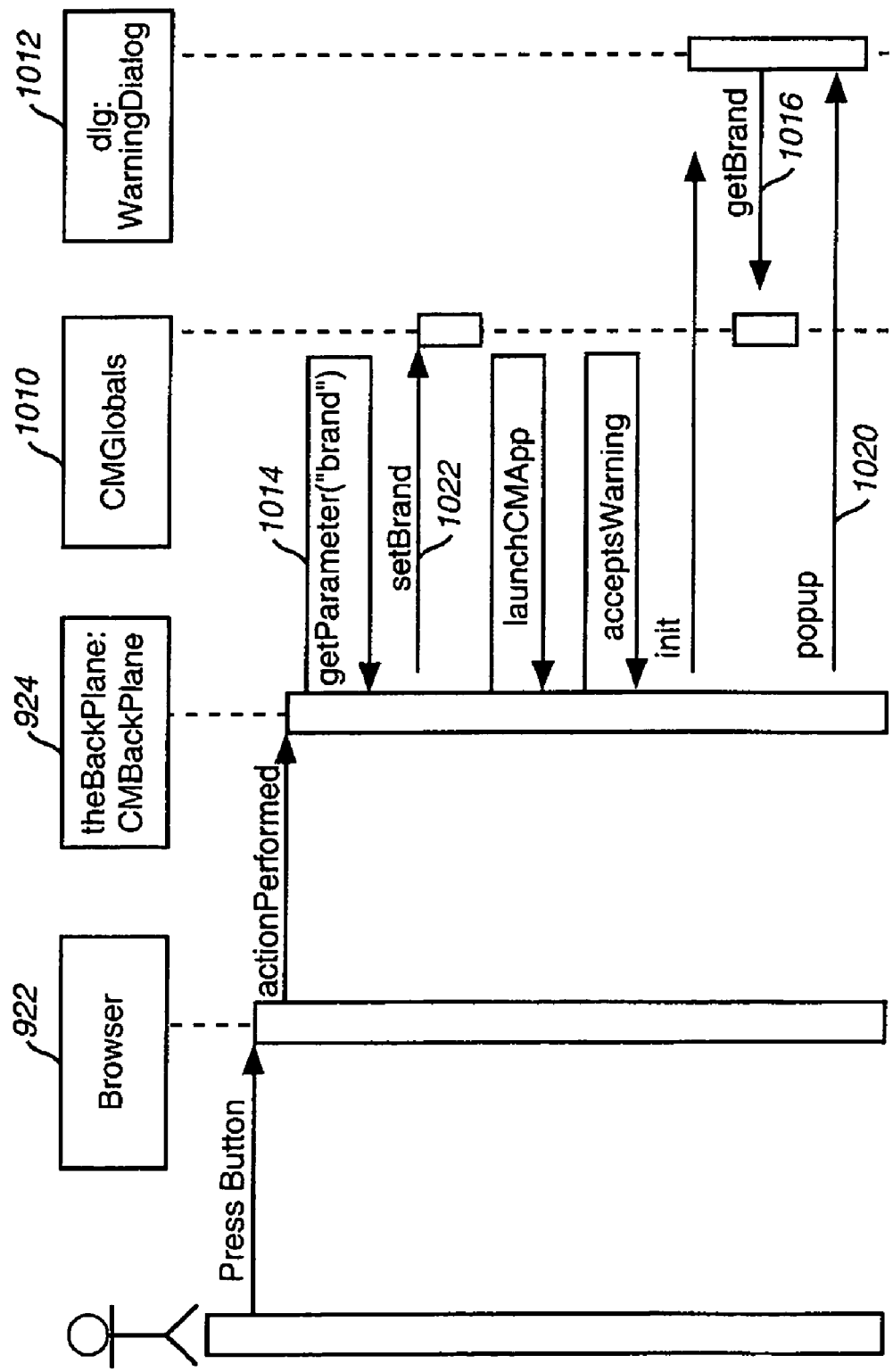
FIG. 16 illustrates a scenario diagram showing an example of branding process for presenting a warning dialog with a company brand.
Figure 21:
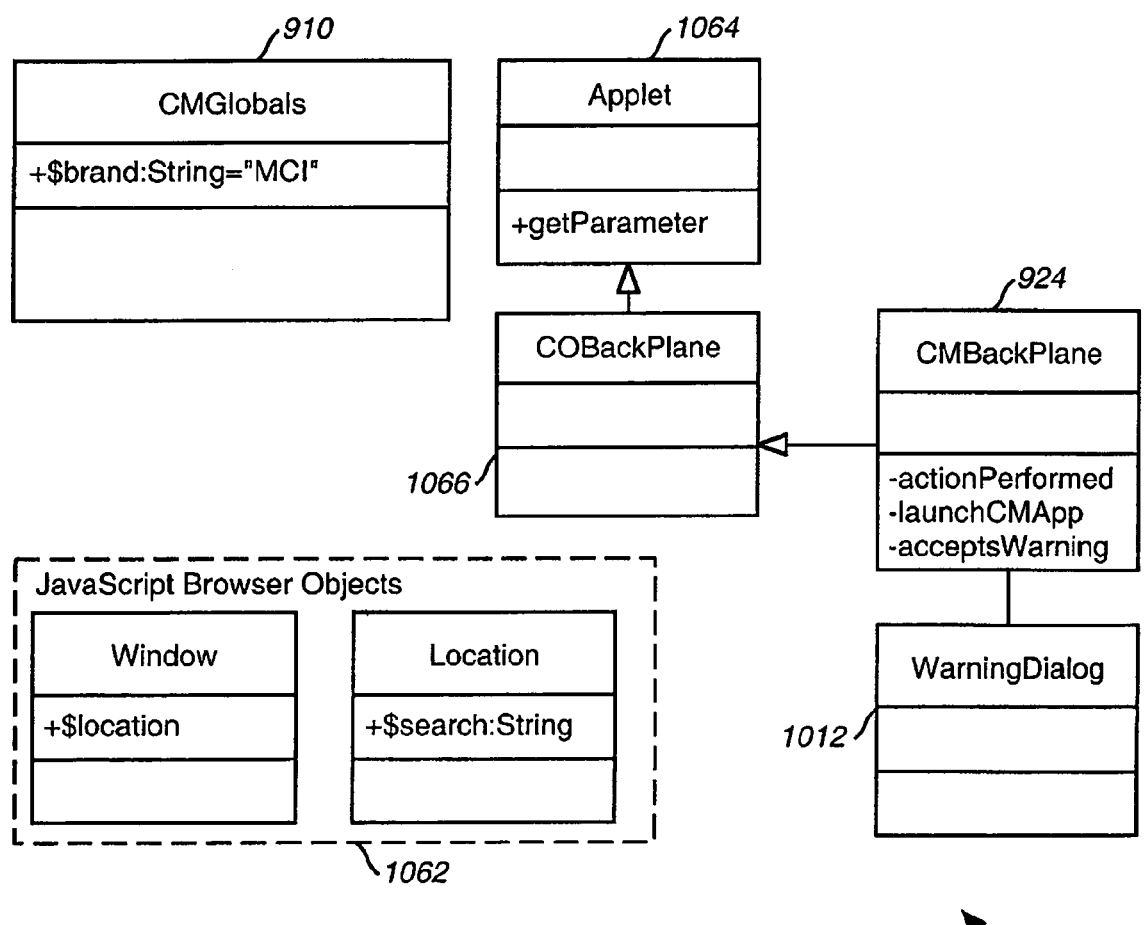
FIG. 21 illustrates an example of a class diagram including classes used in branding process.

The present invention supports a branding functionality which allows users to open the call manager webstation application in a company specific context. FIG. 21 illustrates an example of a class diagram including classes used in branding process. The CMBackPlane class 924 is derived from the COBackPlane class 1066 which is an applet 1064, inheriting all the applet attributes and methods. The main URL for the call manager webstation application uses JavaScript, a client-side scripting language, to render the html. The JavaScript, typically, directs the browser to retrieve a company brand. The browser then opens the call manager webstation application web page with the company brand specified in the query portion of the URL. FIG. 16 illustrates a scenario diagram showing an example of a branding process for presenting a warning dialog with a company brand. Typically, the call manager applet 924 retrieves a company brand name by invoking a getParameter 1014 method (an applet method), and sets the brand name in the CMGlobals class 1010 by invoking a setBrand method 1022. When a WarningDialog 1012 is initialized 1018, it retrieves the brand name by invoking a getBrand method 1016 from the CMGlobals 1010 and displays the brand name on the dialog box upon a popup 1020.

Language Support

Figure 17:
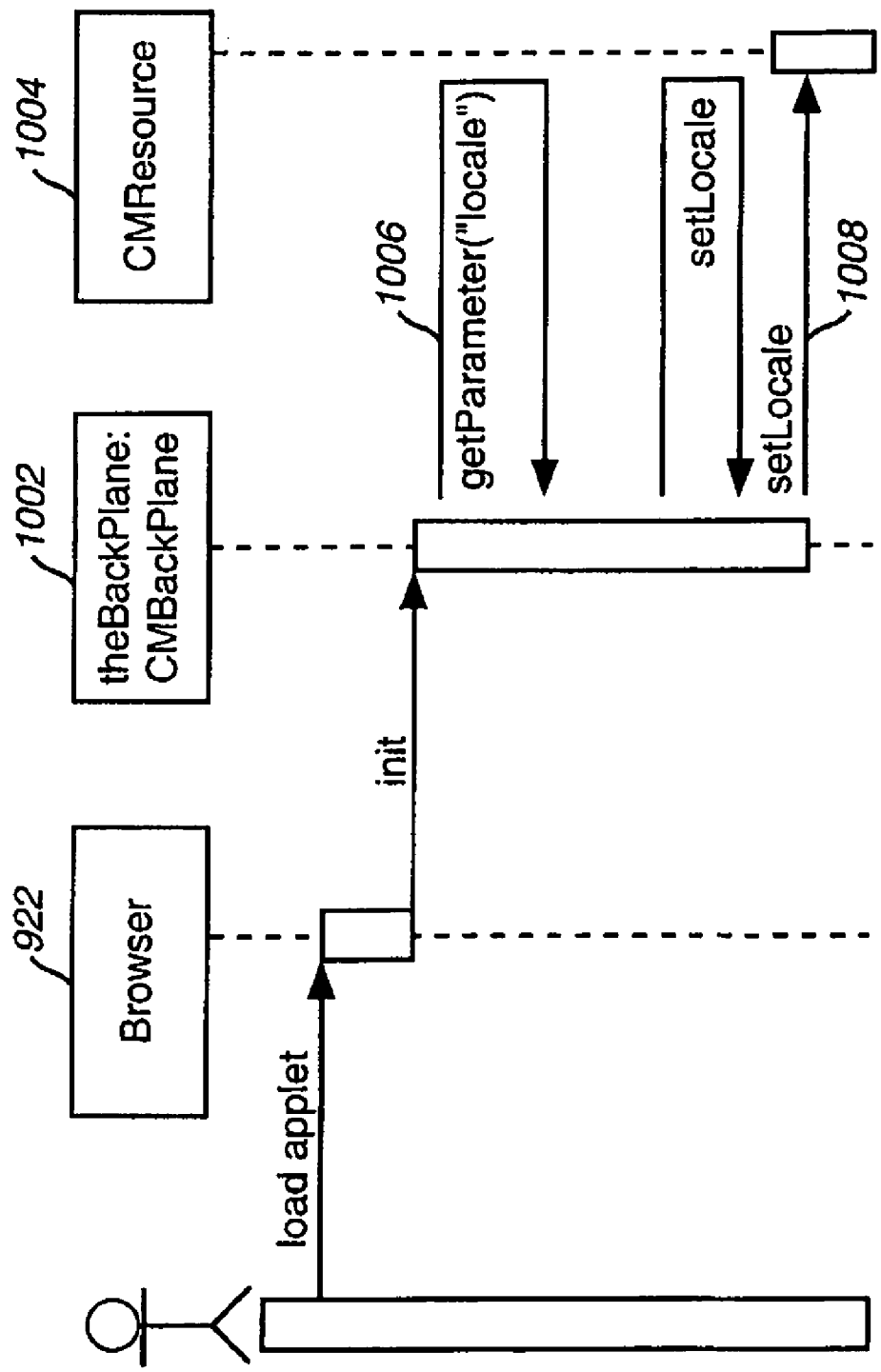
FIG. 17 illustrates a scenario diagram for setting the locale for foreign language support.

The present invention includes an internationalization feature, supporting local languages for text displays. This optional feature allows a user to open the call manager application in a language as set by the user. Subsequent texts and phrases are rendered in the language chosen. Typically, the call manager webstation application is opened with a default language as set by the operating system. The user is also given an option to select a language other than the default. A call manager applet typically determines the locale set for the operating system and launches the appropriate language version by including the locale as a parameter. For example, the parameter with a name "locale" may have one of the following values: "en_US" for English US, "en_CA" for English-Canada, and "fr_CA" for French Canada. The applet uses this value to set the locale for the system string and phrase resources. FIG. 17 illustrates a scenario diagram for setting the locale. The call manager applet 924 determines the locale setting by invoking a getParameter method 1006, and sets the locale by invoking a setLocale method 1008 and using the services of a CMResource class 1004.

Figure 18:
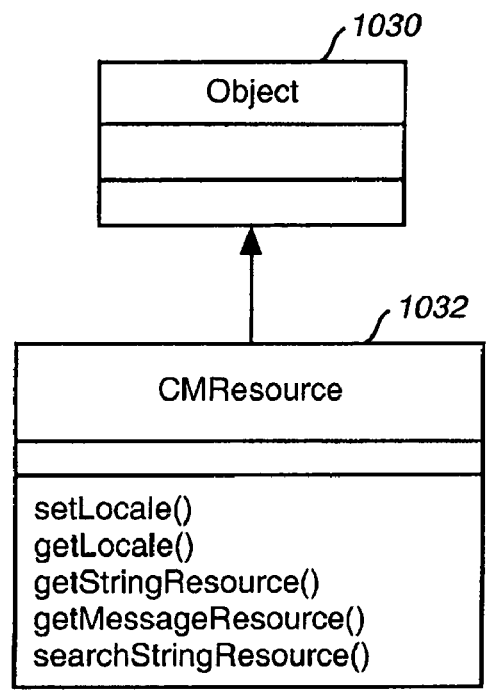
FIG. 18 illustrates a CMResource class diagram used in internalization support.

CMResource handles the general resources of character encoding, numeric formatting and date formatting. FIG. 18 illustrates a CMResource class diagram 1030. The string and message specific resources are handled by the COAppResource classes. The CMResource 1032 is the composite resource object that delegates calls to contained COAppResource objects. A hash table of COAppResource's is populated in CMResource as requests are received. The table includes a COAppResource bundle for each of the main functional areas within the WebStation application, i.e. App, GDD, Rules, NEMS, Reporting, Security, Provisioning, etc. The "App" bundle includes the global resources.

A resource bundle is typically loaded when a request is received. The static method COAppResource.getAppResource loads the bundle for a specific locale. CMResource provides the methods getStringResource and getMessageResource for delegating to the COAppResource bundle to retrieve the translated string or message. If a locale has not been set, the locale defaults to United States.

The COAppResource class generally handles retrieving static strings and/or constructing messages. The static method getAppResource( ) returns an application specific internationalization resource and is used by CMResource to instantiate the resource bundles for each functional area. The methods getStringResource and getMessageResource delegate to the resource specific CMXXXStrings or CMXXXPhrases for string or message lookup.

Figure 19:
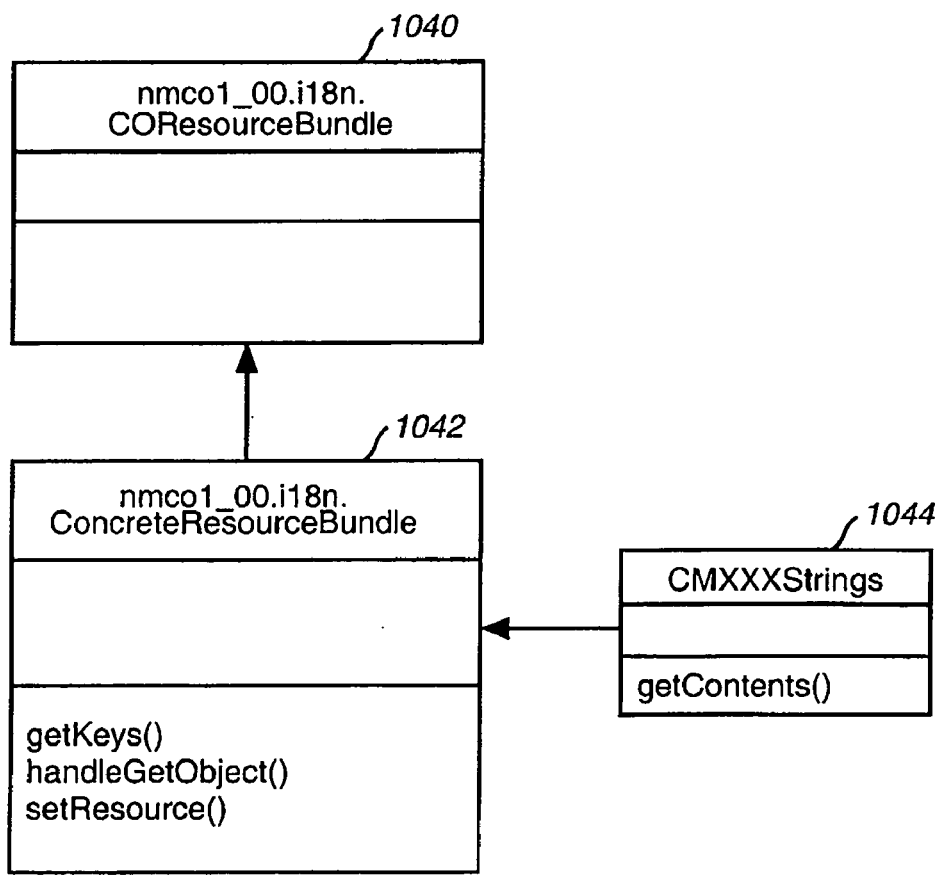
FIG. 19 illustrates an example of a CMXXXString class diagram, used to support internalization by providing string mapping.

FIG. 19 illustrates an example of a CMXXXString class diagram 1040. A ConcreteResourceBundle 1042 is an abstract class to be used for defining string and message resources. The key-value pairs are defined in a data structure which is returned in a method getContents( ). This subclass is typically named using the format:

AppResource+"Strings"+"_"+language+"_"+country, where the AppResource is the name of the application resource, language is the language being translated, and the country uses predefined page for country labels, e.g., US=United States.

Figure 20:
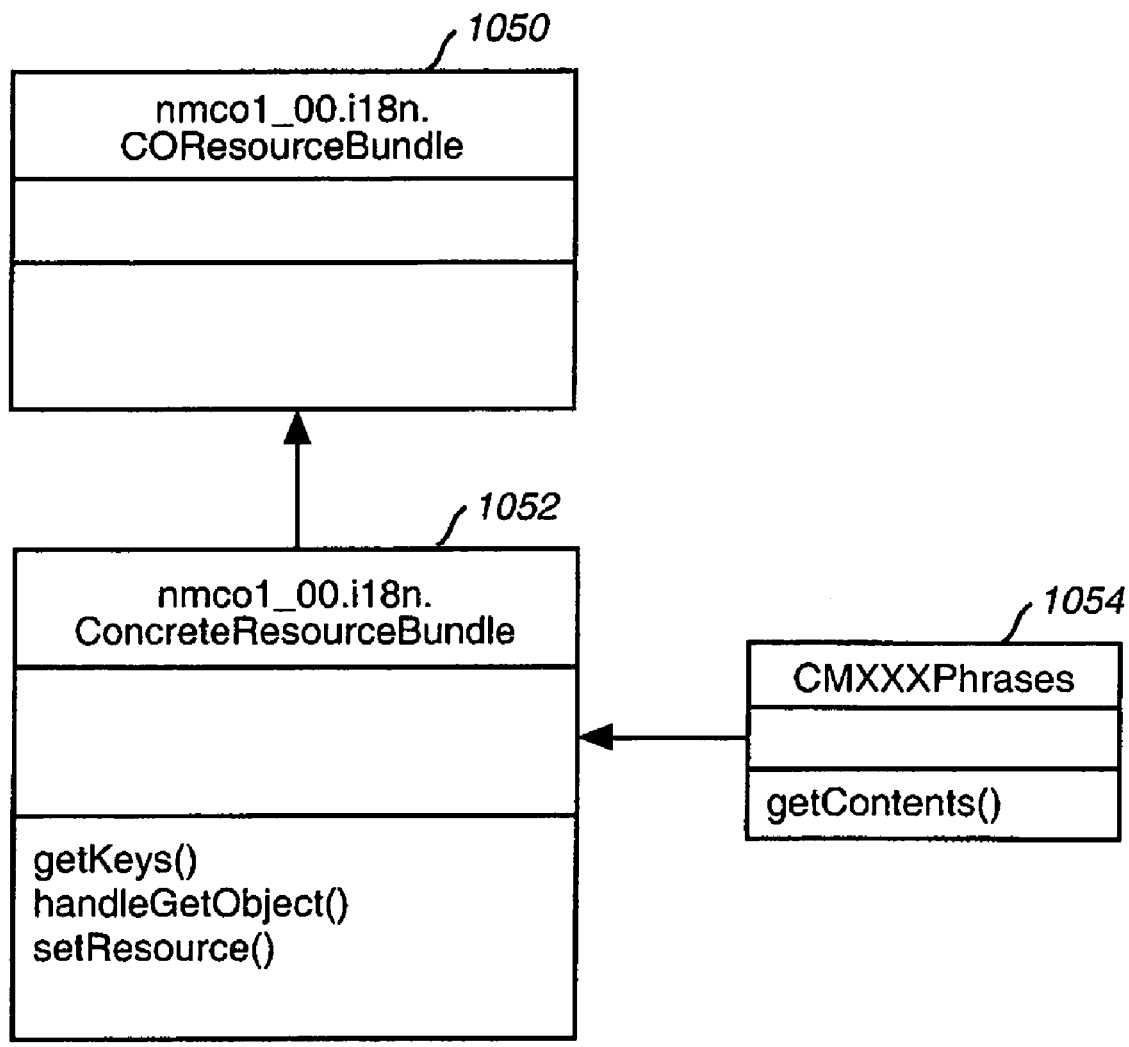
FIG. 20 illustrates an example of a CMXXXPhrases class diagram, used to support internalization by providing phrase translations.

An AppResource typically exists for each functional area within the webstation. In addition, there is a global list of resources that are common to many of the functional areas. For example, strings such as "OK", "Cancel" which are used throughout the GUI, are typically placed in the global list. The class naming convention is "CMXXXStrings" 1044, where "XXX" represents the functional area, such as rules, GDD, NEMS and so on. In the case of the global string resources, this class is named CMAppStrings, in reference to the main class webstation.cmco.CMApp Because translation of phrases generally may require more than one-to-one mappings of words, a different methodology is used. FIG. 20 illustrates an example of a CMXXXPhrases class diagram 1052. A phrase template includes variables for inserting data into a location that is applicable for that particular language. The CMXXXPhrases class 1054 description is otherwise identical to the CMXXXStrings 1044 given above.

While the invention has been particularly shown and described with respect to preferred embodiments thereof, it will be understood by those skilled in the art that the foregoing and other changes in form and details may be made therein without departing from the spirit and scope of the invention.

What is claimed is:

1. A method for providing call management of a call center, the method comprising:
   presenting, via a browser application, a plurality of options to permit a user to monitor, define, and manipulate call routing parameters associated with a call into the call center;
   receiving data statistics associated with the call center, wherein the data statistics are transmitted across a demilitarized zone (DMZ) server; and
   supporting testing of routing rules specified by the user, wherein the call is routed based on the call routing parameters, the data statistics, and the routing rules.

2. A method according to claim 1, wherein the browser application includes a call manager applet for determining a locale set to support web-based communications via a language selected by the user.

3. A method according to claim 2, wherein the locale set comprises a customer-defined parameter indicating the selected language, the call manager applet implementing a method for retrieving the customer-defined parameter.

4. A method according to claim 2, wherein the browser application utilizes one or more objects for performing character encoding, numeric formatting and date formatting functions for a text message display according to the locale set.

5. A method according to claim 4, wherein the objects correspond to a string resource class and include look-up methods for retrieving static text strings according to a particular web-station application for display in the selected language.

6. A method according to claim 4, wherein the objects correspond to a phrase resource class and include look-up methods for constructing messages according to a particular web-station application for display in the selected language.

7. An apparatus for providing call management of a call center, the apparatus comprising:
   a browser application configured to present a plurality of options to permit a user to monitor, define, and manipulate call routing parameters associated with a call into the call center, the browser application being further configured to receive data statistics associated with the call center via a demilitarized zone (DMZ) server, and to support testing of routing rules specified by the user, wherein the call is routed based on the call routing parameters, the data statistics, and the routing rules.

8. An apparatus according to claim 7, wherein the browser application includes a call manager applet for determining a locale set to support web-based communications via a language selected by the user.

9. An apparatus according to claim 8, wherein the locale set comprises a customer-defined parameter indicating the selected language, the call manager applet implementing an apparatus for retrieving the customer-defined parameter.

10. An apparatus according to claim 8, wherein the browser application utilizes one or more objects for performing character encoding, numeric formatting and date formatting functions for a text message display according to the locale set.

11. An apparatus according to claim 10, wherein the objects correspond to a string resource class and include look-up methods for retrieving static text strings according to a particular web-station application for display in the selected language.

12. An apparatus according to claim 10, wherein the objects correspond to a phrase resource class and include look-up methods for constructing messages according to a particular web-station application for display in the selected language.

13. A method for providing call management of a call center, the method comprising:
   transmitting to a browser application, via a demilitarized zone (DMZ) server, a plurality of options to permit a user to monitor, define, and manipulate call routing parameters associated with a call into the call center;
   transmitting data statistics associated with the call center to the browser application; and
   receiving routing rules specified by the user, wherein the rules are tested by the browser application; and
   routing the call based on the call routing parameters, the data statistics, and the routing rules.

14. A method according to claim 13, wherein the browser application includes a call manager applet for determining a locale set to support web-based communications via a language selected by the user.

15. A method according to claim 14, wherein the locale set comprises a customer-defined parameter indicating the selected language, the call manager applet implementing a method for retrieving the customer-defined parameter.

16. A method according to claim 14, wherein the browser application utilizes one or more objects for performing character encoding, numeric formatting and date formatting functions for a text message display according to the locale set.

17. A method according to claim 16, wherein the objects correspond to a string resource class and include look-up methods for retrieving static text strings according to a particular web-station application for display in the selected language.

18. A method according to claim 16, wherein the objects correspond to a phrase resource class and include look-up methods for constructing messages according to a particular web-station application for display in the selected language.

19. A method according to claim 13, wherein communications with the browser application is over a secure connection.

20. A system for providing call management of a call center, the system comprising:

a demilitarized zone (DMZ) server configured to support a double firewall for secure communications with a browser application;

a data server configured to transmit to the browser application a plurality of options to permit a user to monitor, define, and manipulate call routing parameters associated with a call into the call center, wherein the server is further configured to transmit data statistics associated with the call center to the browser application; and a routing engine configured to communicate with the data server and to route the call based on the call routing parameters, the data statistics, and routing rules specified by the user.

21. A system according to claim 20, wherein the browser application includes a call manager applet for determining a locale set to support web-based communications via a language selected by the user.

22. A system according to claim 21, wherein the locale set comprises a customer-defined parameter indicating the selected language, the call manager applet implementing a system for retrieving the customer-defined parameter.

23. A system according to claim 21, wherein the browser application utilizes one or more objects for performing character encoding, numeric formatting and date formatting functions for a text message display according to the locale set.

24. A system according to claim 23, wherein the objects correspond to a string resource class and include look-up systems for retrieving static text strings according to a particular web-station application for display in the selected language.

25. A system according to claim 23, wherein the objects correspond to a phrase resource class and include look-up systems for constructing messages according to a particular web-station application for display in the selected language.

26. A system according to claim 20, wherein communications with the browser application is over a secure connection.

* * * * *